(12) United States Patent
Colley, III et al.

(10) Patent No.: US 12,264,759 B1
(45) Date of Patent: Apr. 1, 2025

(54) UNIONS FOR HIGH PRESSURE FLOWLINE COMPONENTS

(71) Applicant: KHOLLE Magnolia 2015, LLC, Tomball, TX (US)

(72) Inventors: E. Lee Colley, III, Jersey Village, TX (US); Mark C. Dille, Magnolia, TX (US); Scott Taylor Donaldson, Spring, TX (US); William Brent Stroebel, Houston, TX (US); Larry Mitchel Hill, Cypress, TX (US)

(73) Assignee: KHOLLE Magnolia 2015, LLC, Tomball, TX (US)

(*) Notice: Subject to any disclaimer, the term of this patent is extended or adjusted under 35 U.S.C. 154(b) by 273 days.

(21) Appl. No.: 17/671,061

(22) Filed: Feb. 14, 2022

(51) Int. Cl.
*F16L 23/024* (2006.01)
*E21B 43/26* (2006.01)
*F16L 23/18* (2006.01)

(52) U.S. Cl.
CPC ........ *F16L 23/024* (2013.01); *E21B 43/2607* (2020.05); *F16L 23/18* (2013.01)

(58) Field of Classification Search
CPC ..... F16L 23/024; F16L 23/02; F16L 23/0286; F16L 23/036; F16L 23/162; F16L 23/18; F16L 23/20; E21B 43/2607; E21B 17/02
See application file for complete search history.

(56) References Cited

U.S. PATENT DOCUMENTS

| | | | |
|---|---|---|---|
| 2,211,983 A * | 8/1940 | Parris | F16L 23/20 |
| 2,238,462 A * | 4/1941 | Crepeau | F16L 23/162 |
| 3,216,746 A | 11/1965 | Watts | |
| 3,217,922 A * | 11/1965 | Glasgow | |
| 3,403,931 A | 10/1968 | Crain et al. | |
| 3,488,070 A * | 1/1970 | Amiot | F16L 23/02 |
| 3,514,133 A * | 5/1970 | Besse | F16L 23/20 |
| 3,554,581 A | 1/1971 | Mason et al. | |
| 3,680,188 A | 8/1972 | Mason et al. | |
| 4,218,080 A | 8/1980 | Kendrick | |
| 4,919,391 A * | 4/1990 | Kemp | |
| 5,944,319 A * | 8/1999 | Kohlman | F16L 23/18 |
| 6,290,237 B1 | 9/2001 | Graupner | |
| 7,204,525 B2 | 4/2007 | Matzner | |
| 7,549,681 B1 | 6/2009 | Matzner | |
| 10,995,561 B1 | 5/2021 | Travis et al. | |
| 2002/0140184 A1 * | 10/2002 | Janoff | F16L 23/20 |
| 2008/0018108 A1 * | 1/2008 | Svetlik | |
| 2010/0032945 A1 * | 2/2010 | Baker | F16L 23/0286 |
| 2019/0128454 A1 * | 5/2019 | Chirko | E21B 17/02 |
| 2019/0300979 A1 * | 10/2019 | Soma | |

* cited by examiner

*Primary Examiner* — William S. Choi
(74) *Attorney, Agent, or Firm* — Keith B. Willhelm

(57) ABSTRACT

A union is used to join mating high pressure flow line components. The union comprises an abutment, an annular gland, a seal assembly, and a plurality of threaded connectors. The abutment is between bearing surfaces on the mating components. The gland is formed by alignment of rabbets on the mating components and extends axially across and radially inward of the bearing surface. The seal assembly is carried in the gland and comprises first and second elastomeric seals on each side of a metal backup ring. The threaded connectors extend through holes in the mating components and apply axial load to the abutment to form the union.

45 Claims, 19 Drawing Sheets

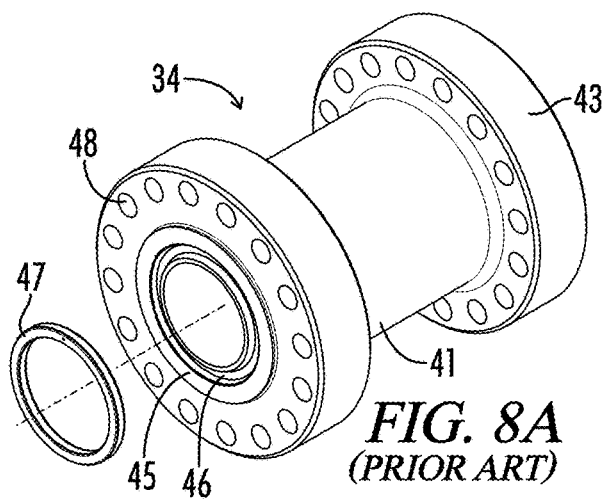
FIG. 8A *(PRIOR ART)*
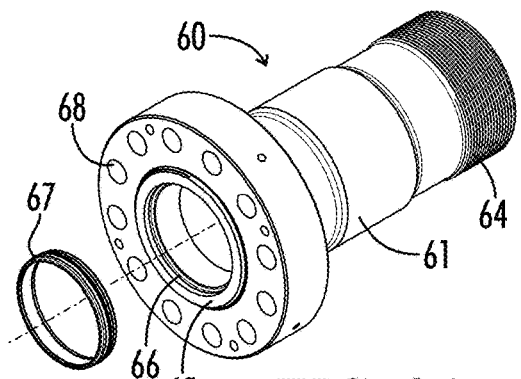
FIG. 9A
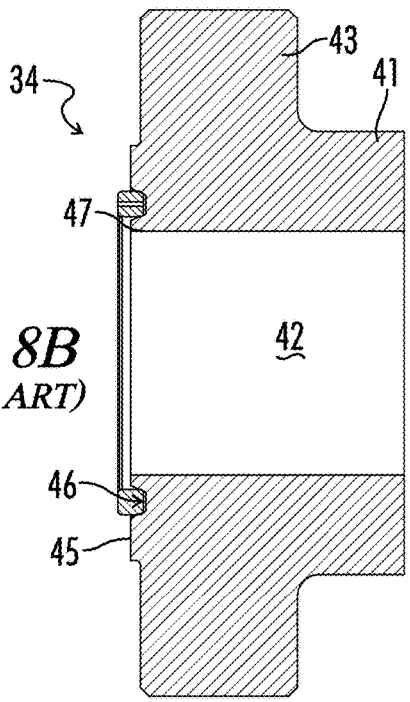
FIG. 8B *(PRIOR ART)*
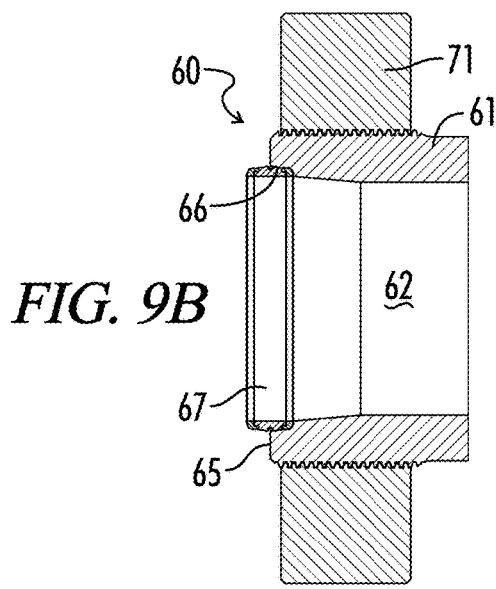
FIG. 9B
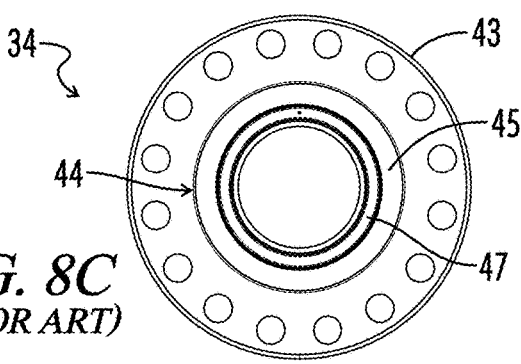
FIG. 8C *(PRIOR ART)*
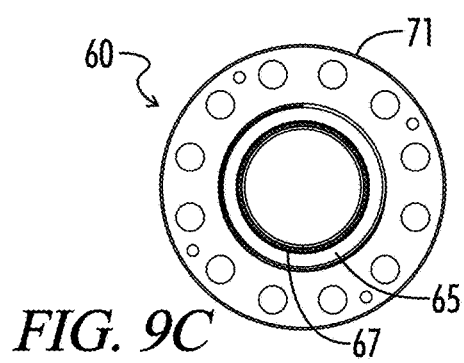
FIG. 9C

UNIONS FOR HIGH PRESSURE FLOWLINE COMPONENTS

FIELD OF THE INVENTION

The present invention relates generally to fluid transportation systems and flow lines and components used in those systems, and especially to systems for conveying abrasive, corrosive fluids under high pressures and flow rate as are widely used in the oil and gas industry. More particularly, it relates to unions by which components of the system may be easily and reliably made up and broken down.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then can flow from the porous formation into the well.

In what is perhaps the most basic form of rotary drilling methods, a drill bit is attached to a series of pipe sections or "joints" referred to as a drill string. The drill string is suspended from a derrick and rotated by a motor in the derrick. A drilling fluid or "mud" is pumped down the drill string, through the bit, and into the bore of the well. This fluid serves to lubricate the bit. The drilling mud also carries cuttings from the drilling process back to the surface as it travels up the wellbore. As the drilling progresses downward, the drill string is extended by adding more joints of pipe.

When the drill bit has reached the desired depth, larger diameter pipes, or casing, are placed in the well and cemented in place to prevent the sides of the borehole from caving in. The well may be extended by drilling additional sections and installing large, but somewhat smaller pipes, or liners. The liners also are typically cemented in the bore. The liner may include valves, or it may then be perforated. In either event, openings in the liner are created through which oil can enter the cased well. Production tubing, valves, and other equipment are installed in the well so that the hydrocarbons may flow in a controlled manner from the formation, into the lined well bore, and through the production tubing up to the surface for storage or transport.

Hydrocarbons, however, are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

Perhaps the most important stimulation technique is the combination of horizontal wellbores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the wellbore, creating flow paths to the well. The proppant serves to prevent fractures from closing when pumping is stopped.

A formation rarely will be fractured all at once. It typically will be fractured in many distinct locations or zones and in many distinct stages. Fluids will be pumped into the well to fracture the formation in a first zone. Typically, the first zone will be at the bottom or "toe" of the well. After the initial zone is fractured, pumping is stopped, and a plug is installed or otherwise established in the liner at a point above the fractured zone. Pumping is resumed, and fluids are pumped into the well to fracture the formation in a second zone located above the plug. That process is repeated for zones further up the formation until the formation has been completely fractured.

Once the well is fractured, large quantities of water and sand that were injected into the formation eventually must be allowed to flow out of the well. The water and sand will be separated from hydrocarbons produced by the well to protect downstream equipment from damage and corrosion. The production stream also may require additional processing to neutralize corrosive agents in the stream.

Systems for successfully completing a fracturing operation, therefore, are extensive and complex, as may be appreciated from FIG. 1. FIG. 1 illustrates schematically a conventional frac system 24. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11.

Pumps 10 take the slurry and discharge it at high pressure through individual high-pressure "discharge" lines 12 into a "missile" 13 on frac manifold 9. The combined flow from pump discharge lines 12 flows through missile 13 into a high-pressure line 14 running to a junction head 15 of a "zipper" manifold 16 (sometimes also referred to as a "frac manifold"). Zipper manifold 16 includes flow lines 17 running to, for example, three well heads 19 that control flow into and out of their respective wells. Valves 18 are provided in zipper flow lines 17 so that the frac slurry may be selectively diverted to one of the well heads 19. Once fracturing is complete, flow back from the fracturing operation discharges into a flowback manifold 20 which leads into flowback tanks 21. Valves 18 then will be operated to divert frac fluid into the other well head 19 to frac that well.

Frac systems are viewed as having "low-pressure" and "high-pressure" sides or, more simply, as having low sides and high sides. The low side includes the components upstream of the inlet of pumps 10, e.g., water tanks 1, hydration unit 3, blending unit 6, and the low-pressure lines 8 of frac manifold 9, which operate under relatively low pressures. The conduits on the low-pressure side typically will be flexible hoses, such as blender hoses 7 and suction hoses 11.

The high side includes all the components downstream of the discharge outlets of pumps 10, e.g., the high-pressure missiles 13 of frac manifold 9 and flow lines 14 running to zipper manifold 30, which operate under relatively high pressures. The conduits in the high-pressure side of frac systems typically are assembled on site, although some subsystems are pre-assembled on a skid, trailer, or truck, such as frac manifold 9 and zipper manifold 30.

The components used to assemble the high side of frac systems are referred to generally as "frac iron," "flow iron," or "ground iron." They include sections of straight steel pipe, such as pup joints. They also include various fittings, such as tees, crosses, laterals, and wyes, which provide junctions at which flow is split or combined. In addition to junction fittings, flowline components include fittings which are used to alter the course of a flow line. Such directional fittings include elbows and swivel joints. High-pressure flow lines also incorporate gauges and other monitoring equipment, as well as control devices such as shut-off, plug, check, throttle, pressure release, butterfly, and choke valves.

Because frac systems are required at a site for a relatively short period of time, frac iron components often are joined by unions. Unions allow the components to be connected ("made up") and disconnected ("broken down") relatively quickly, more quickly than threaded connections that may be preferred for permanent installations. The three types of unions commonly used in frac systems are hammer (or "Weco®") unions, clamp (or "Gravloc®") unions, and flange unions. Though spoken of in terms that may imply they are discreet components, unions are actually interconnected subassemblies of the components joined by the union. One sub will be on one component, and a mating sub will be on the other. The subs then will be connected to each other to provide the union.

Flange unions, though not necessarily, commonly provide a connection between two components having mating flanges, such as spooled pipe. Spooled pipe, or simply "spools," have annular flanges that extend radially outward from each end, thus giving it the appearance of a spool. The flanges have union faces that allow two spools to mate and be joined at their flanges. A bearing surface typically is provided on the union face by a shallow, annular boss extending concentrically around the conduit openings. A seal, most commonly a metal seal having a hexagonal cross-section, is carried in a groove in the annular boss.

Flange unions are assembled by threaded connectors. The flanges of conventional spools, for example, are provided with a number of through holes. The holes are arrayed angularly around the conduit openings. Once the holes are aligned, bolts are passed through the holes in the mated flanges. Nuts then are threaded on the bolts to generate axial force across the flanges. That axial force not only connects the flanges, but also loads the bearing surfaces and seal in the union faces, thus ensuring a secure, pressure tight union between connected spools.

Flange unions may be made up and broken down with relative ease. Their basic design is robust and reliable and well suited for high pressure flow lines. Within the broader category of high pressure flow lines, components joined by flange unions have been adapted for low pressure service (1,000 to 2,000 pounds per square inch (psi)), medium pressure service (2,000 to 4,000 psi), and high pressure service (6,000 to 20,000 psi). Though not without their advantages, flange unions suffer certain disadvantages as compared to other types of unions because they rely on a relatively large number of threaded connections to make up the union. A conventional 7-inch spool rated for 15,000 psi, for example, requires 16 bolts to make up a union. A 5-inch spool of the same rating requires 12 bolts. Hammer unions, for example, may be made up and broken down much more quickly.

Making up or breaking down any particular union may not require an inordinate amount of time. Frac systems, however, are assembled from a very large number of individual components. Some assemblies, such as frac manifold 9, are assembled off site on skids or trailers and transported as a unit to the well site. Conventional zipper manifolds, such as zipper manifold 16, also allow a single, core blending and pumping subsystem 25 to service multiple well heads 19. Using modular units and zipper manifolds help reduce the number of components that must be assembled on site. Nevertheless, assembly of so many units and individual components on site still can be time consuming, expensive, and hazardous.

Thus, frac systems have become even larger to allow servicing even more, and more widely dispersed wells. For example, as shown schematically in FIG. 2, core blending and pumping subsystem 25 of frac system 24 is used to provide fluid not only to its zipper manifold 16, but to two other remote, satellite zipper manifolds 16. Core subsystem 25 comprises frac manifold 9 and all upstream components shown in FIG. 1. High pressure flow line 14 feeds into a junction head 26. Junction head 26 is connected to three feeder lines 27 leading to each zipper manifold 16.

Such satellite systems necessary entail an even larger number of components. In some operations, however, the cost of connecting remote, satellite zipper manifolds 16 is more than offset by the time and cost savings in assembling and disassembling frac system 24 in multiple locations. The pads required for satellite zipper manifolds 16 also are much smaller and require commensurately less effort and expense to prepare than a pad large enough to accommodate frac system 24.

Frac fluids are pumped through the system at extremely high pressures and flow rates. Not only is the slurry abrasive, but it often is corrosive as well. Frac iron components, therefore, may suffer relatively rapid erosion. Any failure of a component on site may interrupt fracturing, potentially reducing its effectiveness. Any servicing of the components necessarily increases the time and cost required to complete the operation.

Frac jobs also have become more extensive, both in terms of the pressures required to fracture a formation and the time required to complete all stages of an operation. Prior to horizontal drilling, a typical vertical well might require fracturing in only one, two or three zones at pressures usually well below 10,000 psi. Fracturing a horizontal well, however, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 3 thousand gallons per minute (gpm)—for several days before fracturing is complete.

Frac iron components, therefore, are fabricated from steel and are quite rugged and heavy. Especially when rated for higher pressure, the conduit walls of frac iron are thick. Even the smallest frac iron component typically requires a powered lift to handle it during make up and break down. The weight of frac iron also drives up the costs of transporting a frac system to and from a well site. More trucks and heavier loads may be required, increasing the carbon footprint of the operation.

Manufacturing frac iron also is costly and wasteful. For example, an API spool providing a nominal 7-inch conduit, commonly is made of high tensile steel, such as 4130 and 4140 chromoly steel or from somewhat harder, stronger steel such as 4130M7, high end nickel alloys, and stainless steel. The internal diameter of the conduit is 7.06" (inches) and the outer diameter is 12.81". The flanges are 4.03" thick and have an outer diameter of 19.88". The spool, however, typically is machined from a solid bar of steel approximately 19.88" in diameter. The bar must undergo a tremendous amount of milling, at considerable time and expense, before it is shaped into a spool. Even for the shortest and smallest-diameter spools, the process mills away most of the steel in the bar from which the spool is made. While the cuttings may be recycled, the process is inefficient and wasteful and contributes further to the carbon footprint of the system.

The statements in this section are intended to provide background information related to the invention disclosed and claimed herein. Such information may or may not constitute prior art. It will be appreciated from the foregoing, however, that there remains a need for new and improved components for frac systems and other high-pressure fluid transportation systems, especially for new and improved swing valves and valve systems. Likewise, there is a need for new and improved methods of servicing those valves. Such disadvantages and others inherent in the prior art are addressed by various aspects and embodiments of the subject invention.

SUMMARY OF THE INVENTION

The subject invention, in its various aspects and embodiments, relates generally to fluid transportation systems, and especially to systems for fracturing oil and gas wells and other systems that transport abrasive or corrosive fluids at high flow rates and pressures. More particularly, it is directed to unions by which components of the system may be easily and reliably made up and broken down. It also is directed to flowlines and systems having components joined by the novel unions. The invention encompasses various embodiments and aspects, some of which are specifically described and illustrated herein.

One broad embodiment provides for a system for fracturing a well. The system comprises a flow line and a union. The flowline is adapted to convey frac fluid discharged from one or more high-pressure pumps to a well head. The union joins a first component of the flow line and a second component of the flow line. Each of the first and second flowline components comprises a conduit having an end, an annular bearing surface on an end face of the conduit end, a plurality of holes arrayed around the annular bearing surface, the holes being adapted to accommodate threaded connectors, and an annular rabbet in the end face extending around the inner circumference of the bearing surface. The union comprises and abutment, an annular gland, a seal assembly, and a plurality of threaded connectors. The abutment is between the bearing surface of the first flowline component and the bearing surface of the second flowline component. The annular gland extends axially across the abutment, and radially inward of the abutment. The gland is formed by alignment of the rabbet of the first flowline component and the rabbet of the second flowline component. The seal assembly is carried in the gland and comprises a metal seal backup ring and first and second elastomeric seal rings. The metal seal backup ring is carried in a center portion of the gland and extends axially across the abutment. The first elastomeric seal ring is carried in the gland between the backup ring and a first side of the gland. The second elastomeric seal ring is carried in the gland between the backup ring and a second side of the gland. The plurality of threaded connectors extends through the holes in the first flowline component and the holes in the second flowline component and apply axial load to the abutment to form the union.

Other embodiments provide such systems where at least one of the first and second flowline components comprises external threads on the conduit end and a rotatable flange. The rotatable flange has a central opening with internal threads engaging the external threads on the conduit end. The conduit is fabricated from high yield steel, and the holes are arrayed on the rotatable flange.

Additional embodiments provide such systems where at least one of the first and second flowline components comprises a conduit fabricated from high yield steel, and the holes are arrayed on an integral flange extending around the conduit end and the annular bearing surface.

Yet other embodiments provide such systems where the backup ring has an outer gland engagement surface having first and second beveled surfaces matching, respectively, a radially inward taper in the side of the first component rabbet and a radially inward taper in the side of the second component rabbet. In other embodiments the taper is from about 5 to about 15°.

Still other embodiment provide such systems where the backup ring has an annular rabbet at each end thereof and the elastomer seals have a lip nesting in the backup ring rabbets.

Further embodiments provide such systems where at least one of the first and second flowline components is fabricated from high yield steel, or where the conduit of at least one of the first and second flowline components is fabricated from high yield steel pipe, or where at least one of the first and second flowline components is fabricated from hot rolled seamless steel pipe.

Other embodiments provide such systems where the conduit has an internal diameter of approximately 7 inches, a nominal wall thickness, and a pressure rating of 15,000 psi, wherein the ratio of the internal diameter and the wall thickness is from about 5 to about 9.

Additional embodiments provide such systems where the conduit has an internal diameter of approximately 7 inches, a nominal wall thickness, and a pressure rating of 20,000 psi, wherein the ratio of the internal diameter and the wall thickness is from about 4 to about 7.

Yet other embodiments provide such systems where the conduit has an internal diameter of approximately 5 inches, a nominal wall thickness, and a pressure rating of 15,000 psi, wherein the ratio of the internal diameter and the wall thickness is from about 5 to about 9.

Still other embodiments provide such systems where the conduit has an internal diameter of approximately 5 inches, a nominal wall thickness, and a pressure rating of 20,000 psi, wherein the ratio of the internal diameter and the wall thickness is from about 4 to about 7.

Other embodiments provide such systems where the conduit has an internal diameter of approximately 7 inches and the first and second flowline components have no more than 12 of the threaded connector holes or where the conduit has an internal diameter of approximately 5 inches and the first and second flowline components have no more than 8 of the threaded connector holes.

Additional embodiments provide such systems where at least one of the first and second flowline components is a pipe joint or where both of the first and second flowline components are pipe joints.

Yet other embodiments provide such systems where at least one of the first and second flowline components is an elbow, wye, tee, or cross fitting.

Still other embodiments provide methods for assembling a system for fracturing a well. The methods comprise providing a flow line to convey frac fluid discharged from one or more high-pressure pumps to a well head and assembling the first and second flowline components into the flow line by making up a novel union.

In other aspects and embodiments, the subject invention provides for components nt adapted for assembly into a flow line by a union. The union comprises a bearing surface abutment, an annular gland extending axially across and radially inward of the abutment, and a seal assembly. The seal assembly is carried in the gland and comprises an annular metal seal backup ring carried between first and second elastomeric seals. The flowline component comprises a conduit, an annular bearing surface, a plurality of holes, and an annular rabbet. The conduit has an end. The annular bearing surface is on an end face of the conduit end and is adapted to bear on an annular bearing surface of a second component of the flow line to provide the abutment. The plurality of holes are arrayed around the annular bearing surface and are adapted to accommodate threaded connectors extending through the holes in the flowline component and through a plurality of holes in the second component. The threaded connectors apply axial load to the abutment to form the union. The annular rabbet extends around the inner circumference of the bearing surface. It is adapted to align with an annular rabbet of the second component to form the gland and to receive the first elastomeric seal adjacent the annular metal seal backup ring.

Other embodiments provide such flowline components where the conduit of the flowline component comprises external threads on the conduit end and a rotatable flange. The rotatable flange has a central opening with internal threads engaging the external threads on the conduit end. The conduit is fabricated from high yield steel. The holes are arrayed on the rotatable flange.

Additional embodiments provide such flowline components where the conduit of the flowline component is fabricated from high yield steel and where the holes in the flowline component are arrayed on an integral flange extending around the conduit end of the flowline component.

Yet other embodiments provide such flowline components where the conduit is fabricated from high yield steel pipe or where the conduit is fabricated from hot rolled seamless steel pipe.

Still other embodiments provide such flowline components where the conduit has an internal diameter of approximately 7 inches, a nominal wall thickness, and a pressure rating of 15,000 psi, wherein the ratio of the internal diameter and the wall thickness is from about 5 to about 9.

Further embodiments provide such flowline components where the conduit has an internal diameter of approximately 7 inches, a nominal wall thickness, and a pressure rating of 20,000 psi, wherein the ratio of the internal diameter and the wall thickness is from about 4 to about 7.

Other embodiments provide such flowline components where the conduit has an internal diameter of approximately 5 inches, a nominal wall thickness, and a pressure rating of 15,000 psi, wherein the ratio of the internal diameter and the wall thickness is from about 5 to about 9.

Additional embodiments provide such flowline components where the conduit has an internal diameter of approximately 5 inches, a nominal wall thickness, and a pressure rating of 20,000 psi, wherein the ratio of the internal diameter and the wall thickness is from about 4 to about 7.

Still other embodiments provide such flowline components where the flowline component is a pipe joint or where it is an elbow, wye, tee, or cross fitting.

Further embodiments provide such flowline components where the flowline component comprises a second conduit end identical to the conduit end.

Other embodiments provide such a high-pressure fluid transportation system comprising the novel flowline components or where the system is adapted to convey frac fluid discharged from one or more high-pressure pumps to a well head.

Additional embodiments provide methods of assembling a system for fracturing a well where the method comprises providing a flow line to convey frac fluid discharged from one or more high-pressure pumps to a well head and assembling the novel flowline components into the flow line.

In other aspects and embodiments, the subject invention provides for systems for fracturing a well. The system comprises a flow line adapted to convey frac fluid discharged from one or more high-pressure pumps to a well head and a union. The union joins a first component of the flow line and a second component of the flow line. The first flowline component comprises a conduit and a rotatable flange. The conduit is fabricated from high yield steel pipe. The conduit has a nominal wall thickness and an upsetted end. The upsetted end of the conduit provides a portion of increased wall thickness relative to the conduit nominal wall thickness. An annular bearing surface is on an end face of the upsetted conduit end. An annular groove is in the bearing surface. The rotatable flange has a plurality of holes adapted to accommodate threaded connectors. The second flowline component comprises a conduit having an end and a plurality of holes adapted to accommodate threaded connectors. An annular bearing surface is on an end face of the conduit end. An annular groove is in the bearing surface. The union comprises an abutment, an annular gland, an annular metal seal, and a plurality of threaded connectors. The abutment is between the bearing surface of the first flowline component and the bearing surface of the second flowline component. The annular gland is formed by alignment of the groove of the first flowline component and the groove of the second flowline component. The annular metal seal is carried in the gland. The plurality of threaded connectors extend through the holes in the rotatable flange of the first flowline component and the holes of the second flowline component. The threaded connectors apply axial load to the abutment and the seal.

Other embodiments provide such systems where the first flowline component comprises external threads on the upsetted conduit end and the rotatable flange has a central opening having internal threads engaging the external threads on the upsetted conduit end.

Additional embodiments provide such systems where the first flowline component is a pipe joint or where the conduit of the pipe joint is fabricated from hot rolled seamless steel pipe.

Yet other embodiments provide such systems where the conduit has an internal diameter of approximately 7 inches, a nominal wall thickness, and a pressure rating of 15,000 psi, wherein the ratio of the internal diameter and the wall thickness is from about 5 to about 9.

Still other embodiments provide such systems where the conduit has an internal diameter of approximately 7 inches, a nominal wall thickness, and a pressure rating of 20,000 psi, wherein the ratio of the internal diameter and the wall thickness is from about 4 to about 7.

Further embodiments provide such systems where the conduit has an internal diameter of approximately 5 inches, a nominal wall thickness, and a pressure rating of 15,000 psi, wherein the ratio of the internal diameter and the wall thickness is from about 5 to about 9.

Other embodiments provide such systems where the conduit has an internal diameter of approximately 5 inches, a nominal wall thickness, and a pressure rating of 20,000 psi, wherein the ratio of the internal diameter and the wall thickness is from about 4 to about 7.

Additional embodiments provide such systems where the gland has a hexagonal cross-section and the grooves of the first and second flowline components have a semi-hexagonal cross-section.

Still other embodiments provide methods of assembling a system for fracturing a well. The methods comprise providing a flow line to convey frac fluid discharged from one or more high-pressure pumps to a well head and assembling the first and second flowline components into the flow line by making up the novel unions.

In other aspects and embodiments, the subject invention provides components adapted for assembly into a flow line by a union. The union has a bearing surface abutment, an annular gland in the abutment, and an annular metal seal carried in the gland. The flowline component comprises a conduit and a rotatable flange having a plurality of holes adapted to accommodate threaded connectors for loading the rotatable flange with an axial force. The conduit is fabricated from high yield steel pipe. The conduit has a nominal wall thickness and an upsetted end providing a portion of increased wall thickness relative to the conduit nominal wall thickness. An annular bearing surface is on an end face of the upsetted conduit end. The bearing surface is adapted to bear on an annular bearing surface of a second component of the flow line to provide the abutment. Aa annular groove is in the bearing surface. The annular groove is adapted to align with an annular groove in the bearing surface of the second component to form the gland and to receive a portion of the metal seal.

Other embodiments provide such flowline components where the flowline component comprises external threads on the upsetted conduit end and the rotatable flange has a central opening with internal threads engaging the external threads on the upsetted conduit end.

Additional embodiments provide such flowline components where the conduit is fabricated from hot rolled seamless steel pipe.

Yet other embodiments provide such flowline components where the conduit has an internal diameter of approximately 7 inches, a nominal wall thickness, and a pressure rating of 15,000 psi, wherein the ratio of the internal diameter and the wall thickness is from about 5 to about 9.

Still other embodiments provide such flowline components where the conduit has an internal diameter of approximately 7 inches, a nominal wall thickness, and a pressure rating of 20,000 psi, wherein the ratio of the internal diameter and the wall thickness is from about 4 to about 7.

Further embodiments provide such flowline components where the conduit has an internal diameter of approximately 5 inches, a nominal wall thickness, and a pressure rating of 15,000 psi, wherein the ratio of the internal diameter and the wall thickness is from about 5 to about 9.

Other embodiments provide such flowline components where the conduit has an internal diameter of approximately 5 inches, a nominal wall thickness, and a pressure rating of 20,000 psi, wherein the ratio of the internal diameter and the wall thickness is from about 4 to about 7.

Yet other embodiments provide such flowline components where the gland has a hexagonal cross-section and the groove of the flowline component and the second component have a semi-hexagonal cross-section.

Still other embodiments provide such flowline components where the flowline component is a pipe joint or where it is an elbow, wye, tee, or cross fitting.

Further embodiments provide such flowline components where the flowline component comprises a second upsetted end identical to the first upsetted end.

Other embodiments provide high-pressure fluid transportation systems comprising the novel flowline components.

Additional embodiments provide such systems where the system is adapted to convey frac fluid discharged from one or more high-pressure pumps to a well head.

Yet other embodiments provide methods for assembling a system for fracturing a well. The methods comprise providing a flow line to convey frac fluid discharged from one or more high-pressure pumps to a well head and assembling the novel flowline components into the flow line.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the ways in which it may be practiced. The subject invention encompasses other embodiments consistent with the claims set forth herein.

BRIEF DESCRIPTION OF THE DRAWINGS

FIG. 8A (prior art) is an isometric view of conventional spool 34.

FIG. 8B (prior art) is a cross-section view of conventional spool 34.

FIG. 8C (prior art) is an end view of conventional spool 34.

FIG. 9A is an isometric view of novel pipe joint 60.

FIG. 9B is a cross-sectional view of novel pipe joint 60.

FIG. 9C is an end view of novel pipe joint 60.

Figure 1:
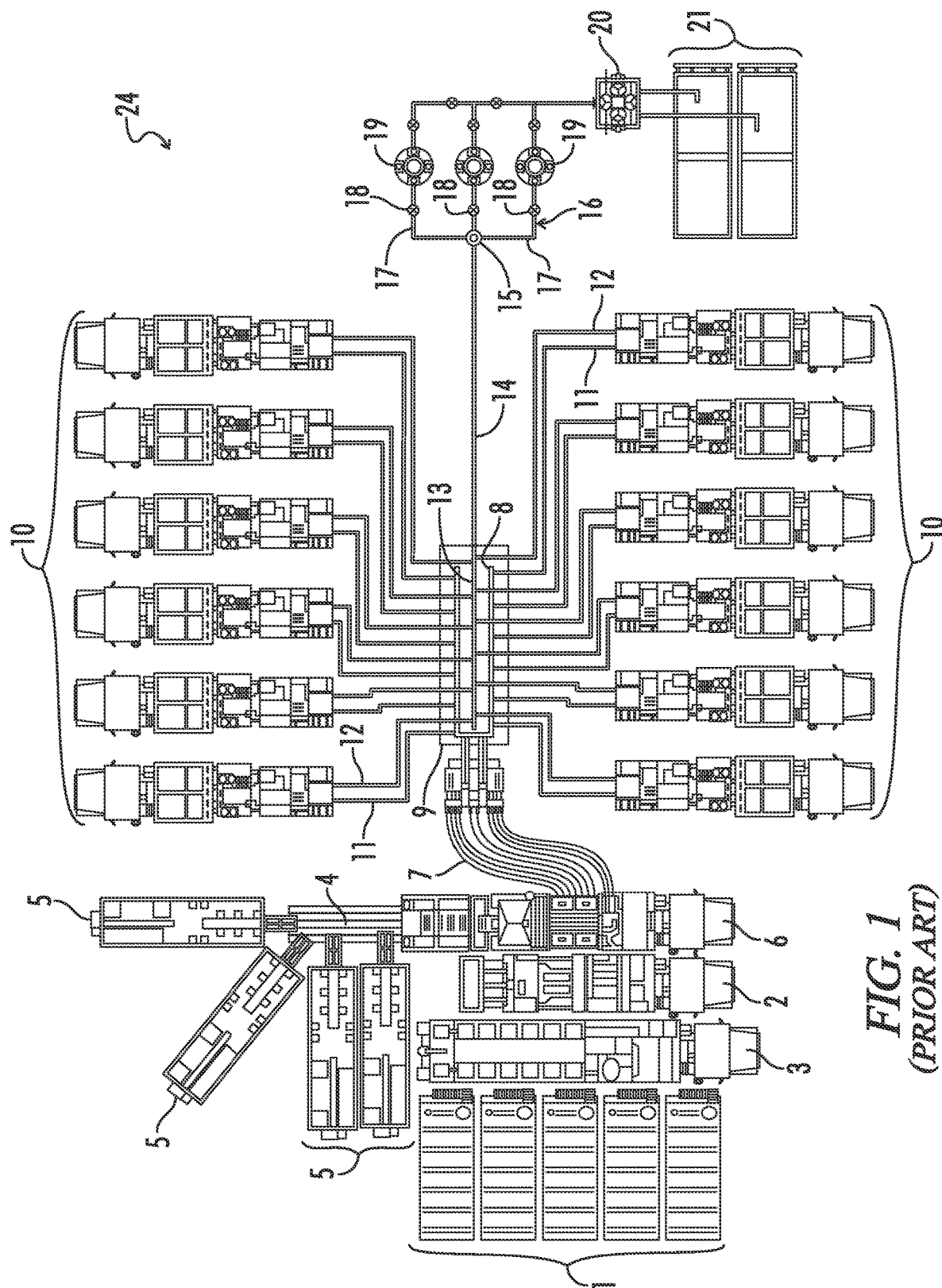
FIG. 1 (prior art) is a schematic view of a system 24 for fracturing a well and receiving flowback from the well which system includes zipper manifold 16 that can selectively divert fluid into three well heads 19.

In the drawings and description that follows, like parts are identified by the same reference numerals. It also will be apparent from the discussion that follows that certain conventions have been adopted to facilitate the description of the novel systems which typically include large numbers of identical components. For example, as discussed below, zipper manifold 30 includes a plurality of identical rotatable elbows 35. Specific individual rotatable elbows 30 may be identified in the drawings, or referenced in the discussion as elbows 30a, 30b, 30c, etc. to distinguish a particular elbow 30 from another elbow 30. The drawing figures also are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The invention, in various aspects and embodiments, is directed generally to fluid transportation systems, flow lines, and to components for those systems and flow lines. It especially relates to systems conveying abrasive, corrosive fluids under high pressure at high flow rates. More specifically, it is directed to unions by which components of a system or flow line may be easily and reliably made up and broken down. Various specific embodiments will be described below. For the sake of conciseness, however, all features of an actual implementation may not be described or illustrated. In developing any actual implementation, as in any engineering or design project, numerous implementation-specific decisions must be made to achieve a developer's specific goals. Decisions usually will be made consistent within system-related and business-related constraints. Specific goals may vary from one implementation to another. Development efforts might be complex and time consuming and may involve many aspects of design, fabrication, and manufacture. Nevertheless, it should be appreciated that such development projects would be routine effort for those of ordinary skill having the benefit of this disclosure.

The novel components and unions typically will be used to connect process or flow units for temporary fluid transportation systems. They are particularly useful for temporary installations that must be assembled and disassembled on site, and which may be installed in various locations. Such systems are common in chemical and other industrial plants, on marine dredging vessels, strip mines, and especially in the oil and gas industry. Frac systems, such as frac system 24 shown in FIG. 1, are a common application where temporary high-pressure flow lines are routinely assembled and disassembled at various sites to provide fluid conduits between process or flow units for different wells.

Figure 2:
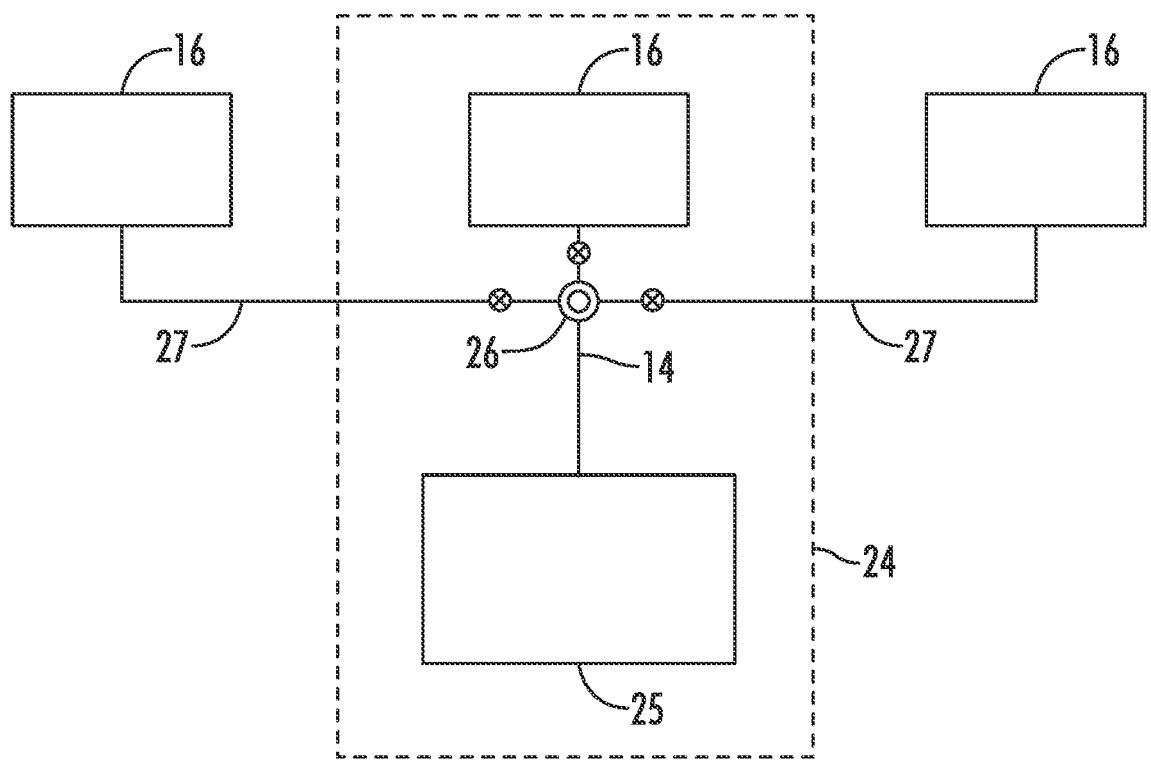
FIG. 2 (prior art) is a schematic view of an expanded system for fracturing a well in which a core subsystem 25 of frac system 24 for blending and pumping frac fluid is connected to zipper manifold 16 and satellite zipper manifolds 16.

The novel unions, components, and flow lines are particularly suited for use in frac systems such as the systems shown in FIGS. 1-2. They may be used and assembled throughout the system, especially in the high side of the system. For example, they may be used in zipper manifold 30 shown in FIG. 3, which itself may be used in frac system 24 instead of zipper manifold 16. The high-pressure discharge from pumps 10 is manifolded in missile 13 of frac manifold 9, fed into a single flow line 14, and thence into zipper manifold 30.

Figure 3:
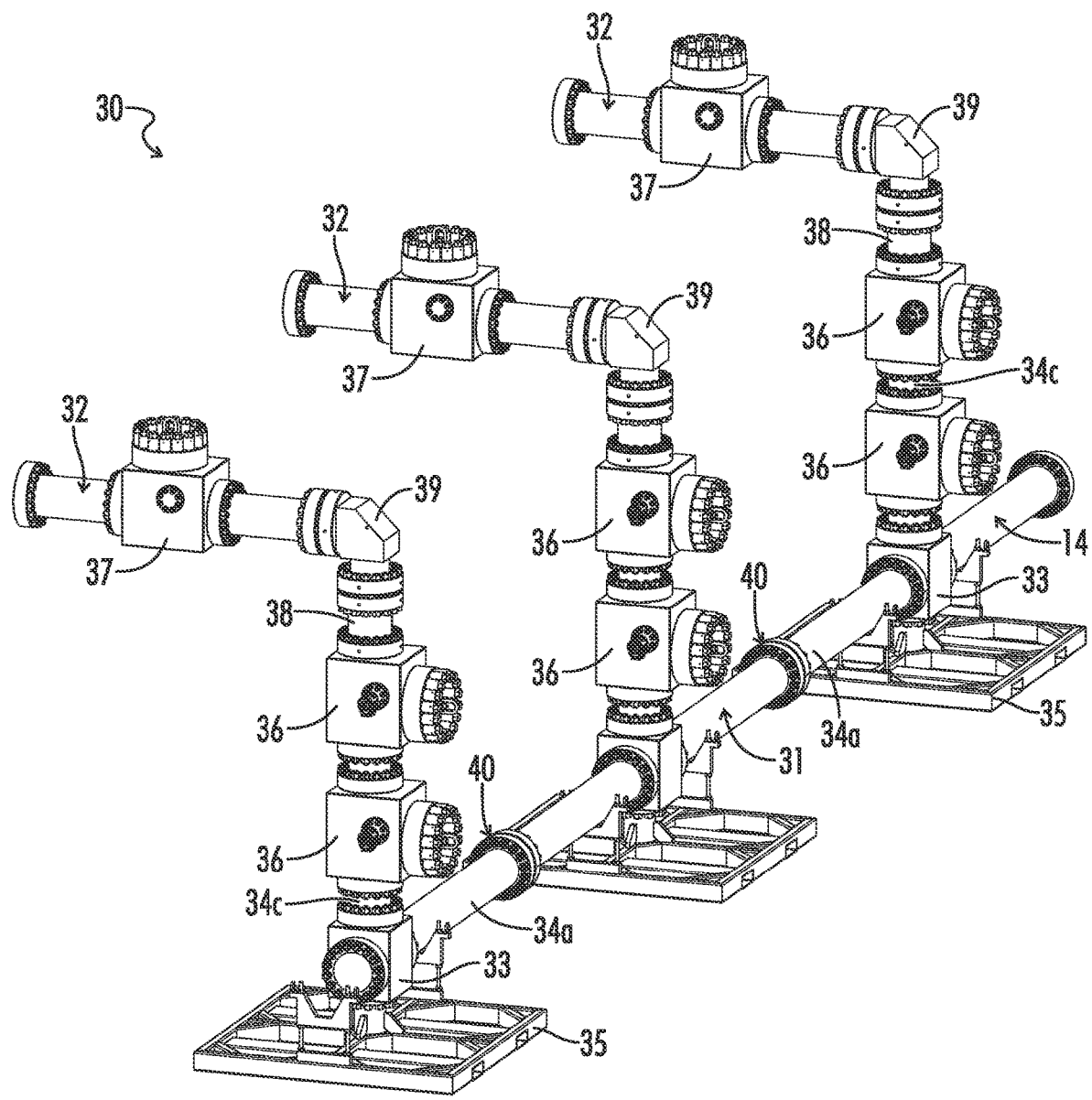
FIG. 3 is an isometric view, taken generally from above and to the left, of a zipper manifold 30 that may be used in frac system 24 and the expanded frac systems shown in FIGS. 1-2.

Zipper manifold 30 is shown in FIG. 3. It can be used to selectively divert frac slurry into multiple well heads, for example, three well heads 19. As described in further detail below, fluid may be selectively diverted into well heads 19 by selective operation of valves 36 in each wellhead flow line 32. For the sake of simplicity, well heads 19 are not shown in FIG. 3. It will be appreciated, however, that the novel flow lines may feed into any conventional wellhead assembly.

As shown in FIG. 3, zipper manifold 30 generally comprises a trunk line or distribution pipe 31 and three wellhead flow lines 32. Distribution pipe 31 comprises tee fittings 33 and relatively long spools 34a. Distribution pipe 31 preferably is mounted on one or more skids or other supports. For example, tee fittings 33 are mounted on pads 35. Pads 35 have cradles that support long spools 34a near their unions with tee fittings 33.

Long spools 34a are conventional spools and are assembled between tee fittings 33 by conventional flange unions 40. Except for its length, long spools 34a are identical to spool 34 shown in FIG. 8. As may be seen therein, spool 34 comprises a pipe 41 that provides a conduit 42 for conveying fluid. A pair of flanges 43 are provided at each end of pipe 41 portion of spool 34. Each flange 43 has outer flat surfaces providing union faces 44.

Though described as "flat" herein and appearing to the casual observers as such, union faces 44, as is typical of flange unions, have a shallow annular boss 45. Annular boss 44 extends concentrically around, and radially outward of the opening of conduit 42. An annular groove 46 is provided in annular boss 45 in which a metal seal ring 47 is carried. Metal seal ring 47 has a hexagonal cross-section.

Bolt holes 48 extend through flanges 43. Holes 48 accommodate passage of threaded connectors, such as nuts and bolts, which are used to generate axial load across the union. As will be appreciated from FIG. 3, long spools 34a may be joined to each other by passing bolts through holes 48 in mated flanges 43. Flanges 43 will be secured to each other, and a load applied to union faces 44 by tightening nuts on the bolts. Annular boss 45 helps ensure that the abutment between mating union faces 44 and seal ring 47 are properly loaded when the union is made up.

Likewise, tee fittings 33 are provided with flange union faces allowing them to be joined by flange unions to long spools 34a and to their respective flow line 32. It will be noted that the body of tee fittings 33 is prismatic and technically lacks a flange, at least in the sense of a radially projecting annular rim. Flange union faces, thus, are provided on a face of the fitting body. Such "flangeless" flange unions are well known in the art, for example, as disclosed in applicant's U.S. Pat. No. 10,995,561 to T. Travis et al. In any event, flow through distribution pipe 31 is diverted into selected wellhead flow lines 32 through tee fittings 33.

Wellhead flowlines 32 each comprise a pair of pivot valves 36, a flapper valve 37, a pair of short spools 34c, a rotatable spool 38, a rotatable elbow 39, and a pair of medium spools 34b, all assembled with flange unions. More specifically, as shown in FIG. 3, pivot valves 36 are assembled into a vertical run portion of flow lines 32. Short spools 34c connect pivot valves 36 to each other and to tee fitting 33. Upper pivot valves 36 are joined to rotatable spools 38 which in turn are joined to rotatable elbows 39. Rotatable elbows 39 lead into a horizontal run comprising medium spools 34b and flapper valve 37. Preferably, as exemplified, rotatable elbows 39 and rotatable spools 38 are provided with union faces and threaded connectors allowing them to be assembled into flow lines 32 through flange unions.

Rotatable elbows 39 and rotatable spools 38 allow relative rotation with and between the other flowline components to which they are assembled. Their construction will not be discussed in detail. Suffice it to say, however, that well heads 19 and distribution pipe 31 cannot be moved easily, and rotatable elbows 39 and rotatable spools 38 provide greater flexibility in laying out and making up well head flow lines 32. Additional rotatable elbows 39, for example, may be used to provide even greater flexibility.

Pivot valves 36 and flapper valve 37 also will not be described in detail here. It will be appreciated, however, that pivot valves 36 may be set in either an open mode (in which they allow flow in both directions) or in a shut mode (in which all flow is shut off). Flapper valve 37 operates in a check mode in which flow is allowed to flow toward wellheads 19, but reverse flow toward pumps 10 is checked. Thus, by selectively setting pivot valves 36 in their open or shut-off modes, the combination of pivot valves 36 and flapper valve 37 may be used effectively as a combined shut-off and check valve, allowing zipper manifold 30 to selectively divert flow into multiple well heads 19. Further details on the construction and operation of zipper manifold 30 and pivot valves 36 and flapper valve 37 are disclosed in applicant's pending patent application Ser. No. 17/576,626, filed Jan. 14, 2022.

A first preferred embodiment 60 of the novel pipe joints is shown in FIGS. 4-7 and 9. Novel pipe joints 60 may be used, for example, in zipper manifold 30 instead of conventional spools 34a. They also may be used to assemble feeder lines 27 running to remote, satellite zipper manifolds 16 as shown schematically in FIG. 2. As described further below, pipe joints 60 may be joined to each other by novel unions 51. Novel adaptors also allow them to be assembled into flow lines, such as zipper manifold 30, that have tee fittings 33 and other frac iron components with conventional flange union faces.

Figure 4:
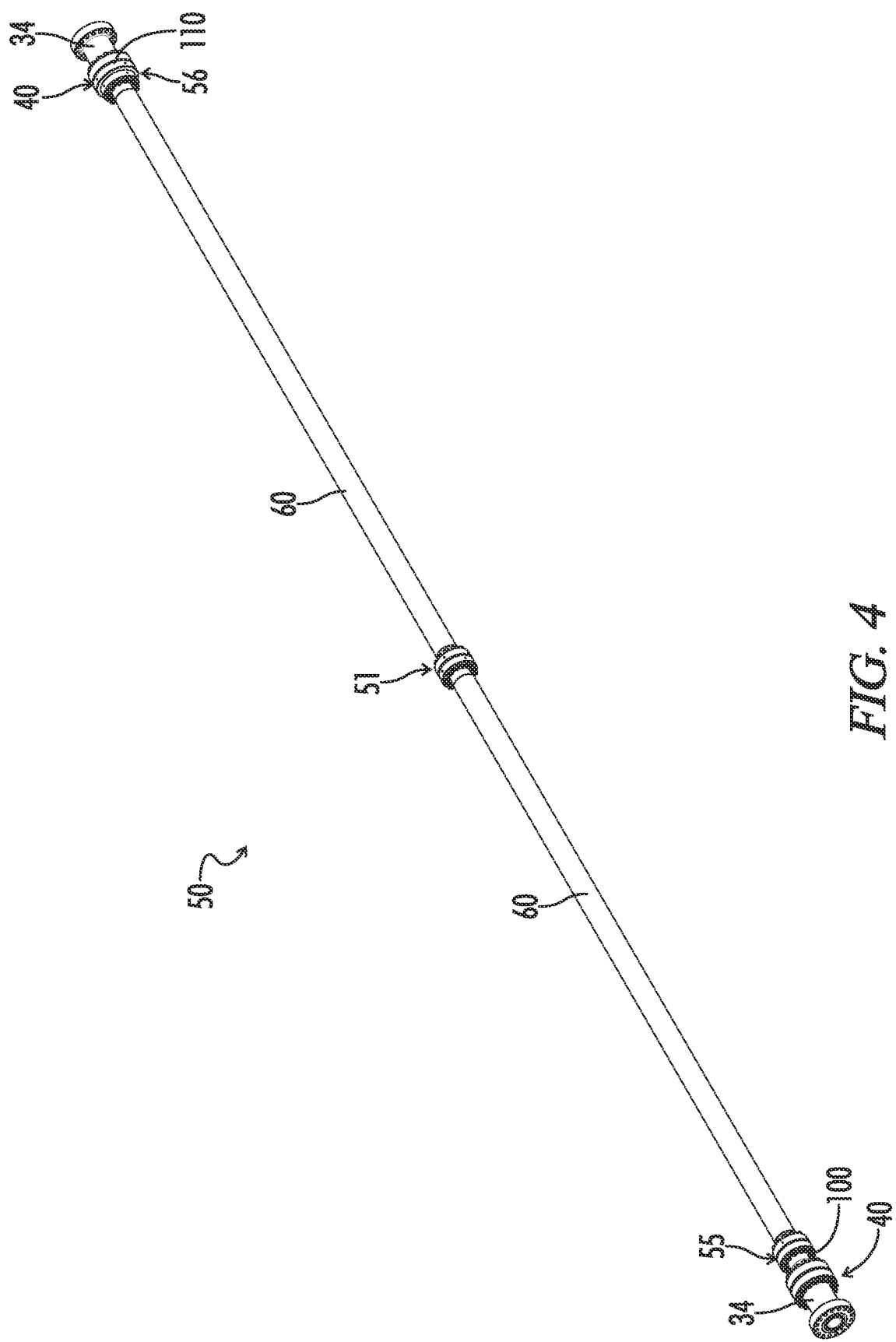
FIG. 4 is an isometric view of a flowline assembly 50 comprising a first preferred embodiment 60 of the novel pipe joints joined by a first preferred embodiment 51 of the novel unions, novel pipe joints 60 being shown in lengths as may be used to assemble relatively long runs of flow lines.
Figure 5:
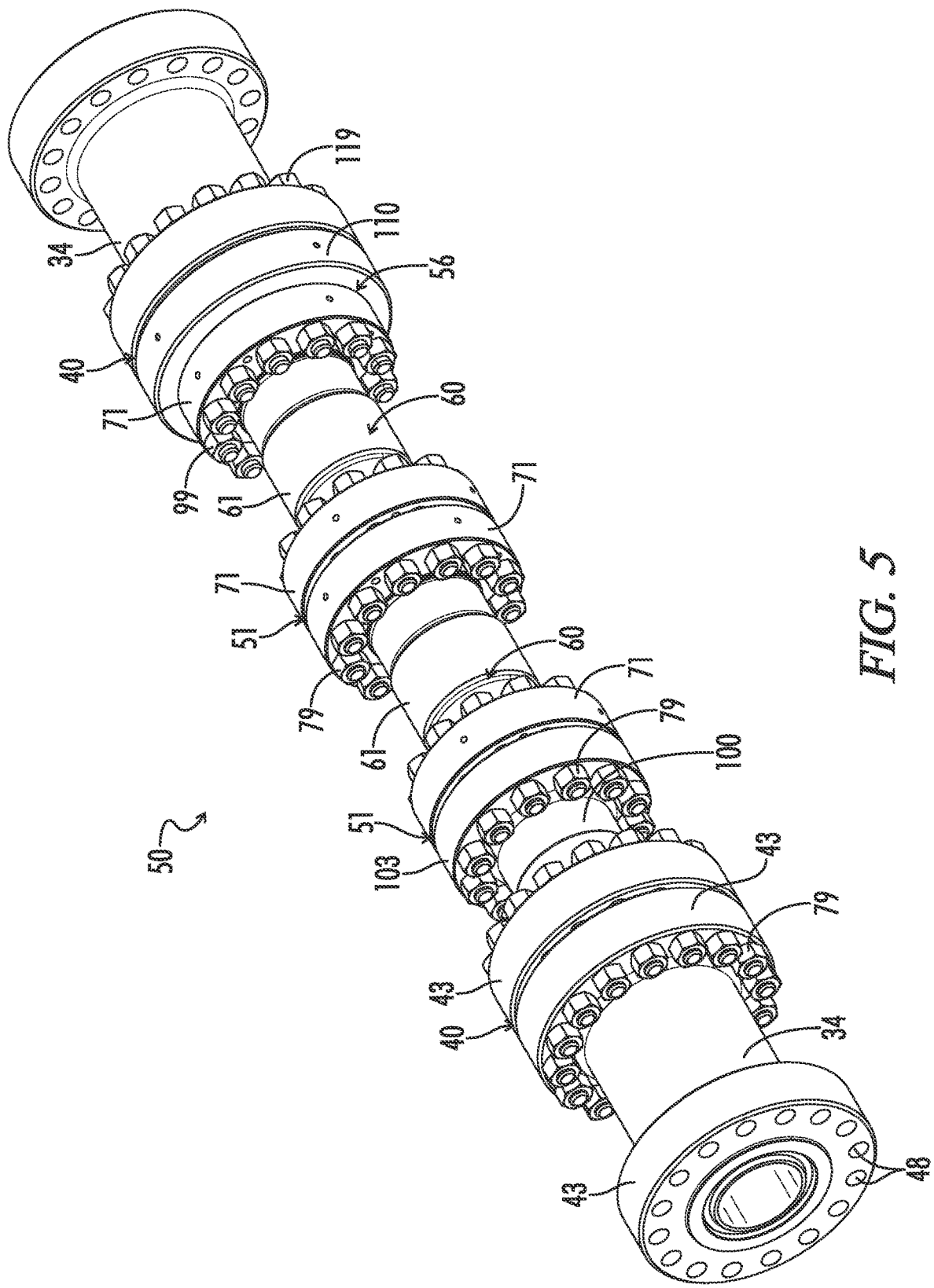
FIG. 5 is an isometric view of flowline assembly 50 shown in FIG. 4, but with pipe joints 60 being shown with substantially shorter lengths to allow enlargement of the view and to better illustrate a first preferred embodiment 100 of the novel adaptors of the subject invention and a second preferred embodiment 110 of the novel adaptors.
Figure 6:
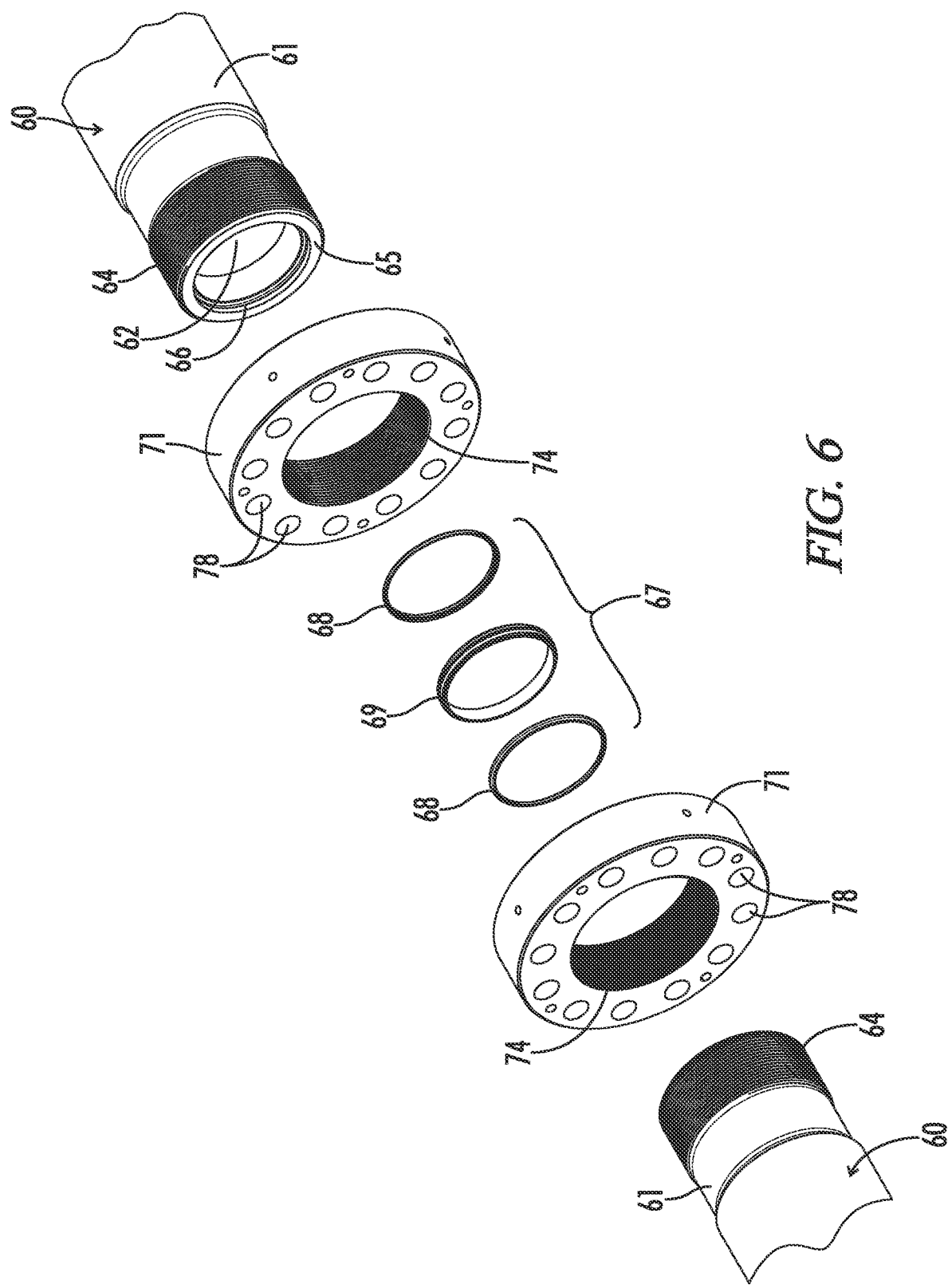
FIG. 6 is an exploded, isometric view showing union 51 joining pipe joints 60 shown in FIGS. 4-5.

Thus, FIGS. 4-5 illustrate pipe joints 60 in the context of a flowline assembly 50 comprising various novel adaptors. Pipe joints 60 are shown in FIG. 4 in lengths suitable for assembling relatively long runs of flow lines. They are shown in FIG. 5 in considerably shorter lengths to allow enlargement of the figure and more clearly show the adapters with which they may be used. More specifically, flowline assembly 50 comprises a conventional spool 34, a first preferred embodiment 100 of the novel adaptors of the subject invention, a first and second pipe joint 60, a second preferred embodiment 110 of the novel adaptors, and a second conventional spool 34.

Novel pipe joints 60 comprise a pipe 61 and a pair of flanges 71. Pipe 61 is an open cylindrical component that provides a conduit 62 for the flow of fluids through pipe joint 60. The ends of pipe 61 are provided with external threads 64. Flanges 71 are rotatably mounted, respectively, on opposite ends of pipe 61.

More specifically, flanges 71 are generally disc shaped components having a central hole, giving them the shape of a toroid. The central hole is large relative to the diameter of flanges 71. Internal threads 74 on the central hole of flanges 71 engage external threads 64 on the ends of pipe 61. Threads 64/74 may be, for example, 6 pitch ACME threads. Other conventional thread designs, preferably coarser, deeper straight threads, such as square threads, may be adapted for use in the novel fittings. The threads are not required to form a seal. They are intended only to transmit load from flange 71 to pipe 61 and preferably allow flanges 71 to be rotated about pipe 61 easily by hand. Holes 78 in flanges 71 thus may aligned easily by rotating flanges 71 as needed.

A union 51 may be made up between pipes 61 with threaded connectors 79, such as nuts and bolts. The bolts extend through holes 78 in flanges 71. Axial load across the union is generated by tightening the nuts on the bolts.

Figure 7:
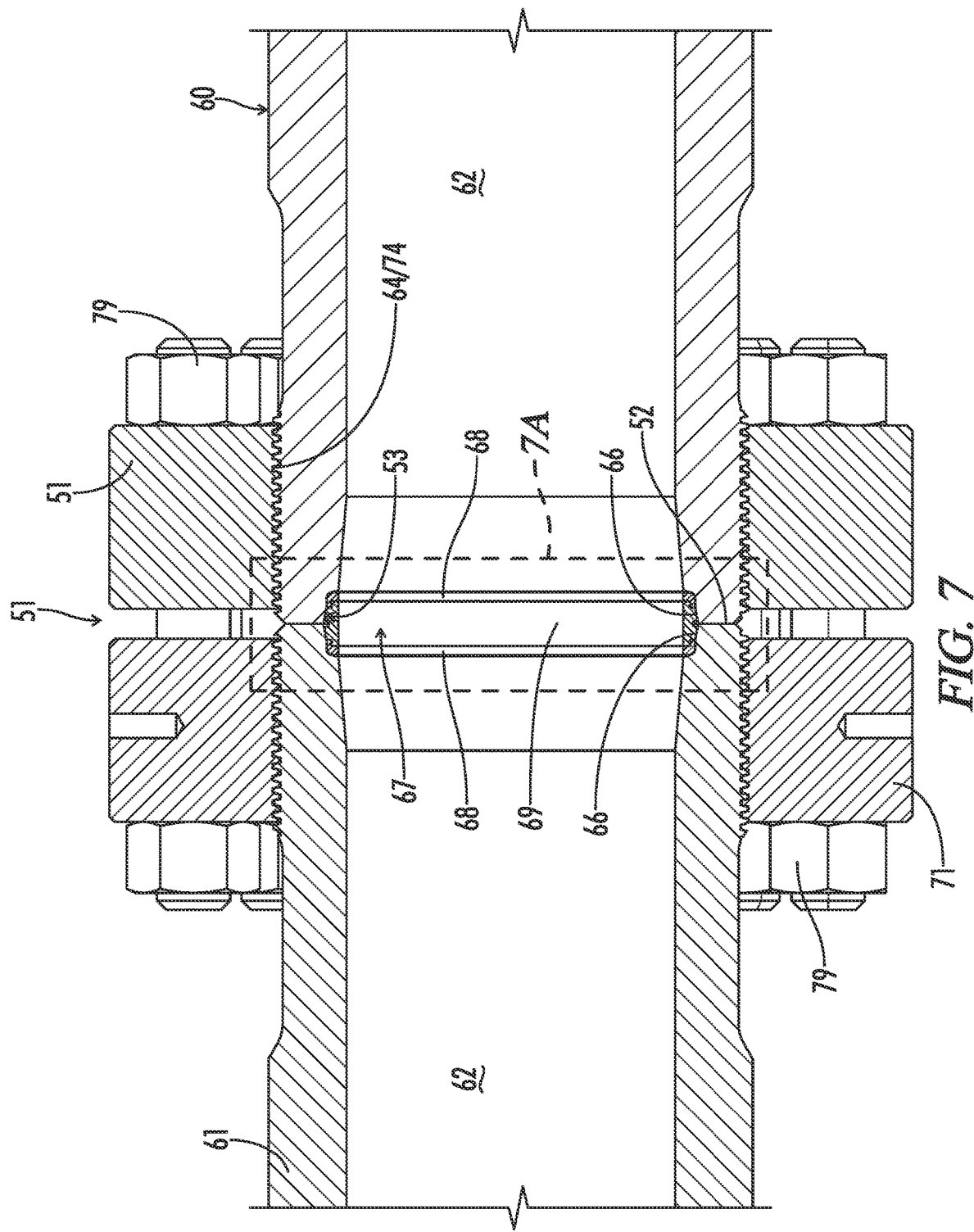
FIG. 7 is a cross-sectional view of union 51 joining pipe joints 60.
Figure 7A:
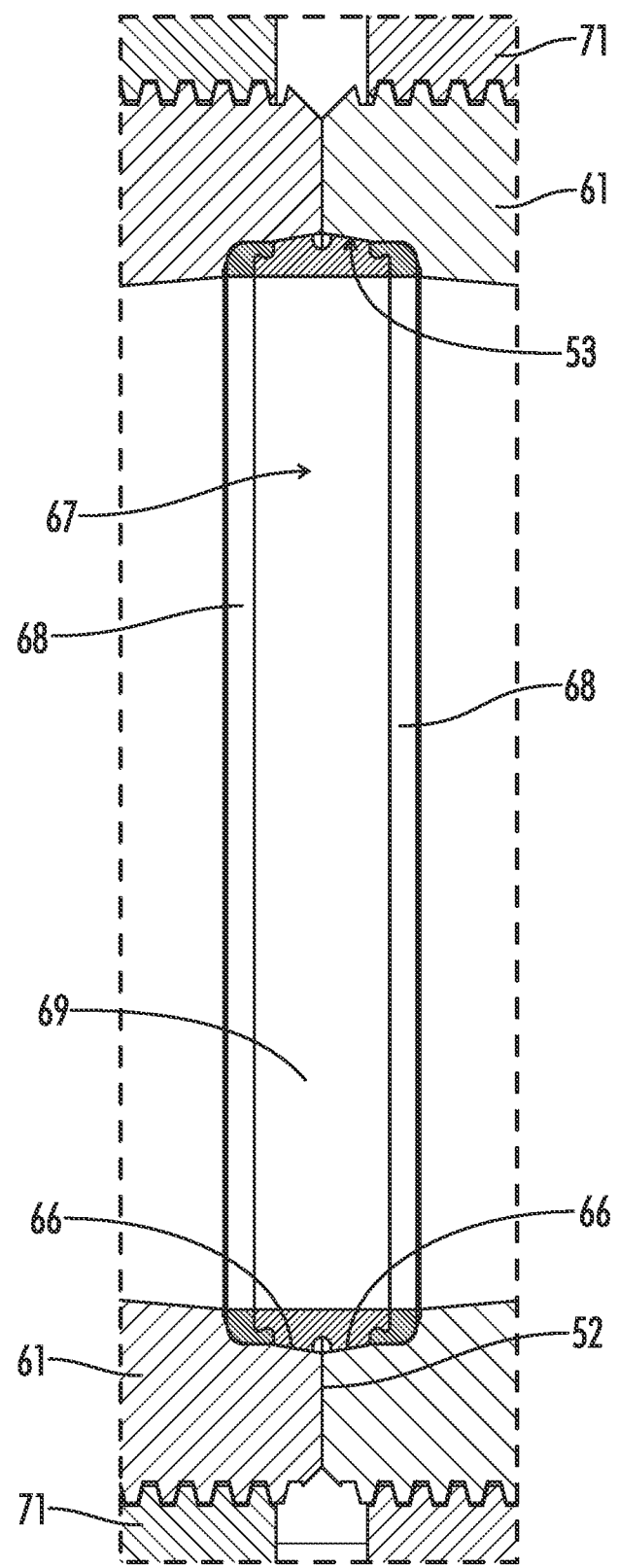
FIG. 7A is an enlarged, partially exploded view of portion A of union 51 shown in FIG. 7.

As seen best in FIGS. 7A and 9, the face of each end of pipe 61 is provided with an annular bearing surface 65 and an annular rabbet 66. Rabbet 66 is a step-shaped recess cut along the inner edge of the end face of pipe 61. It thus extends around the inner circumference of bearing surface 65. When union 51 is made up, as shown in FIG. 7, bearing surfaces 65 of joined pipes 61 form an abutment 52. Rabbets 66 align to form an annular gland 53 extending axially across abutment 52. Gland 53 thus is provided with an axial extending bottom and two radially extending sides.

Rabbets 66 preferably, as seen best in FIG. 7A, taper radially inward along their sides, that is, as they extend axially from the inner edge of their respective bearing surfaces 65. Preferably, the tapers are from about 5 to 15°, more preferably about 10°. The bottom of gland 53 (formed by the mating sides of rabbets 66) thus tapers radially outward from its edges to its center. The sides of gland 53 (formed by the bottom of rabbets 66) preferably extend substantially perpendicular to the central axis of conduit 62.

A seal assembly 67 is carried in gland 53. Seal assembly 67 comprises a pair of elastomer pressure seal rings 68 and a backup ring 69. Backup ring 69 is fabricated from metal, preferably steel, and is carried in the center portion of gland 53 such that it extends axially across abutment 52 between pipes 61. The outer surface of backup ring 69 engages the bottom of gland 53 and has a profile complimentary thereto. Thus, outer, gland engagement surface of backup ring 69 has beveled surfaces matching the tapers in rabbets 66 and gland 53.

Elastomer seal rings 68 are carried in gland 53, one on each side of backup ring 69 and inside the sides of gland 53. Preferably, as shown, seal rings are provided with a small annular lip that extends axially along the bottom of gland 53 toward backup ring 69. The lips nest inside small annular rabbets provided at each end of backup ring 69. The lip and rabbets allow seal rings 68 to be loosely mounted on backup ring 69. Seal assembly 67 can be manipulated as a unit for easier insertion when union 51 is being made up. Seal rings having a generally rectangular cross-section or other geometry, however, may be suitable.

Seal rings 68 are adapted to isolate hydraulic pressure within conduit 62 and to prevent flow of fluids through union 51. At higher pressures, the tensile moduli or "viscosity" of an elastomeric seal may be such that the elastomeric material can tend to flow out of a seal gland. Extrusion of material can cause the seal to fail. Backup ring 69 preferably is fabricated from a steel that allows it to expand elastically under pressure into close contact with the bottom of gland 53. It thus minimizes the likelihood that seal rings 68 will extrude through abutment 52 and allow fluid to leak through union 51.

Pressure seal rings 68 typically will be fabricated from elastomers such as nitrile butadiene rubber (NBR), hydrogenated nitrile butadiene nitrile rubber (HNBR), fluoroelastomers such as Viton® and Dyneon™, and tetrafluoroethylene propylene rubbers, such as Aflas™, polyurethane, and fluorosilicone. The choice of materials will be driven by conventional considerations, most commonly the nature of the fluids, the temperatures, and the pressures to which the seals will be exposed. For example, fluoroelastomers may be preferred for oily and corrosive fluids, and harder nitrile and polyester rubbers may be preferred for higher pressure seals.

Preferably, as exemplified, pipe 61 of pipe joint 60 is fabricated from a high yield steel. For example, pipe joint 60 may be made from heat-treated AISI 4340, a medium carbon, low alloy nickel chromium molybdenum steel. It has a yield strength of 125 kilo-pounds per square inch (ksi).

Other high yield steels also may be suitable, such as stainless, nickel, and other low and high alloy steels. Heat treated steels, such as 4130 P110 (medium carbon, low alloy) and 4140 P11 (chromium, molybdenum, manganese low alloy) may be suitable. Preferably the steels are all clean and free from impurities and have yield strengths of at least about 105 ksi, more preferably at least about 125 ksi. In contrast, 7-inch spools commonly used in frac systems are fabricated from untreated AISI 4130 steel. AISI 4130 steel is a low alloy steel with high amounts of chromium. It has a yield strength of 75 ksi. Thus, the walls of nominal 7-inch spools fabricated from AISI 4130 steel are relatively thick as compared to the walls of nominal 7-inch pipe of the same pressure ratings that are used in the novel assemblies.

The difference may be readily appreciated by comparing FIG. 8 with FIGS. 9, which show, respectively, pipe joint 60 with conventional spool 34. Spool 34 is a conventional spool fabricated from untreated ASI 4130 steel. Both it and novel pipe joint 60 are rated for pressures of 15,000 psi. Conventional spool 34 fabricated from AISI 4130 steel has an ID of 7.06", an OD of 12.81", and wall thickness of 2.88". Pipe joint 60 is fabricated from AISI 4340 P110 steel and has an ID of 6.747". In contrast to spool 80, however, it has an OD of 9.951" and wall thickness of 1.602".

Thus, the novel pipe joints and other fittings of the subject invention preferably have relatively thin walls relative to the inner diameter of the conduit. For example, for a fitting having a conduit with an inner diameter of approximately 7 inches and rated at 15,000 psi per API Specification 6A, the ratio of the inner diameter of the conduit to the wall thickness preferably is from about 5 to about 9. When pipe 60 is fabricated with an inner diameter of approximately 7 inches and from steel having a yield strength of 105 ksi or 125 ksi, for example, the ratio will be, respectively, approximately 6.1 and approximately 7.3. Similarly, if rated for 20,000 psi, the ratio preferably is from about 4 to 7. When pipe 60 is rated for 20,000 psi and fabricated from steel having a yield strength of 105 ksi or 125 ksi, for example, the ratio will be, respectively, approximately 4.5 and approximately 5.4.

As a further example, for a fitting having a conduit with an inner diameter of approximately 5 inches and rated at 15,000 psi, the ratio of the inner diameter of the conduit to the wall thickness preferably is from about 5 to about 9. When pipe 60 is fabricated with an inner diameter of approximately 5 inches and from steel having a yield strength of 105 ksi or 125 ksi, for example, the ratio will be, respectively, approximately 5.7 and approximately 6.6. Similarly, if rated for 20,000 psi, the ratio preferably is from about 4 to 7. When pipe 60 is rated for 20,000 psi and fabricated from steel having a yield strength of 105 ksi or 125 ksi, for example, the ratio will be, respectively, approximately 4.2 and approximately 5.1.

Pipe 61 also preferably is seamless pipe fabricated by a hot or cold roll process in which a metal billet is shaped into a cylinder and then stretched out by rolling it under pressure. Hot rolling is conducted above the recrystallization temperature of the steel and generally will be used to produce larger diameter pipe. Cold rolling is conducted below the steel's recrystallization temperature and generally will be used to produce smaller diameter pipe. It will be appreciated, however, that welded pipe may be used, or that pipe joint 60 and other embodiments of the novel fittings may be made by other techniques, such as by forging, extruding, or mold casting a blank and then machining the blank to provide the desired features.

In that regard, it will be noted that pipe 61 of pipe joint 60 has a portion of reduced outer diameter immediately behind external threads 64. The area of reduced diameter allows flanges 71 to be moved inwardly beyond external threads 64, further away from the end of pipe 61. That allows a worn seal assembly 67 to be replaced more easily without disassembling pipe joint 60 from its flow line. That is, threaded connectors 79 may be removed, and both flanges 71 rotated beyond external threads 64 to create a space between them. A pancake jack then can be inserted between the spaced flanges 71 and operated to create a gap between bearing surfaces 65. The worn seal assembly 67 then can be removed and replaced.

It will be appreciated that novel pipe joints 60 and other embodiments of the invention may be made up more quickly than conventional flange unions. That is, the diameter of seal assembly 67 in novel unions 51, for example, is significantly less than the diameter of metal seal ring 47 in conventional flange unions 40. Thus, other factors being equal, the load required to make up and seal union 51 between novel pipe joints 60 is significantly less than that required for union 40 between conventional spools 34. Moreover, pipe 61 is fabricated from high yield steel whereas pipe 41 in conventional spool 34 is made from high tensile, but lower yield steel. The required wall thickness for pipe 61, therefore, is significantly less than that of pipe 41. That in turn allows the diameter of flanges 71 in pipe joint 60 to be significantly less than the diameter of flanges 43 in spool 34. Flanges 71 of pipe joint 60, for example, are the same size as those used with conventional pipe having a nominal inner diameter of 5", even though the nominal inner diameter of pipe 61 in pipe joint 60 is 7".

Figure 10A:
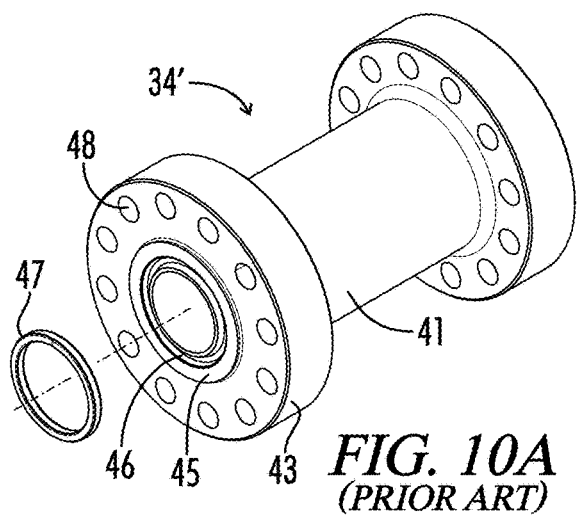
FIG. 10A (prior art) is an isometric view of a conventional spool 34' identical to spool 34 except for a smaller internal diameter.
Figure 11A:
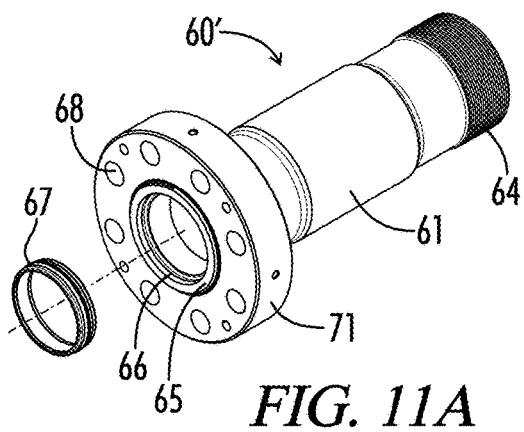
FIG. 11A is an isometric view of a novel pipe joint 60' identical to novel pipe joint except for a smaller internal diameter.
Figure 10B:
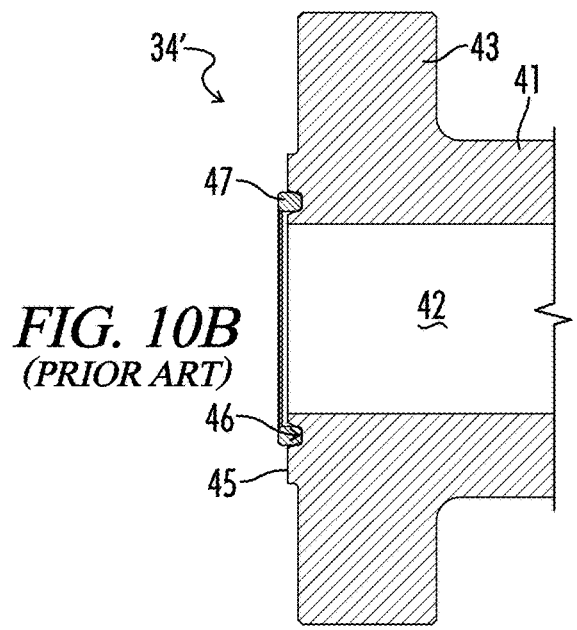
FIG. 10B (prior art) is a cross-section view of conventional spool 34'.
Figure 11B:
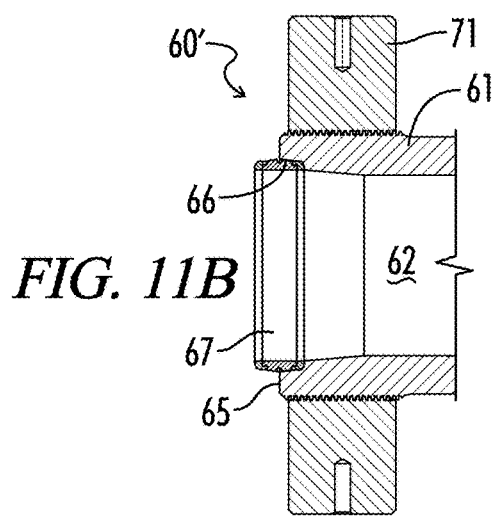
FIG. 11B is a cross-sectional view of novel pipe joint 60'.
Figure 10C:
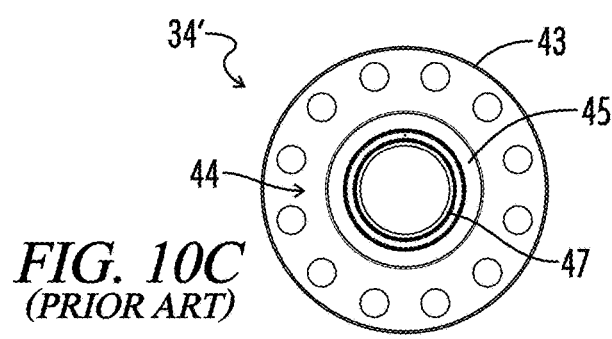
FIG. 10C (prior art) is an end view of conventional spool 34'.
Figure 11C:
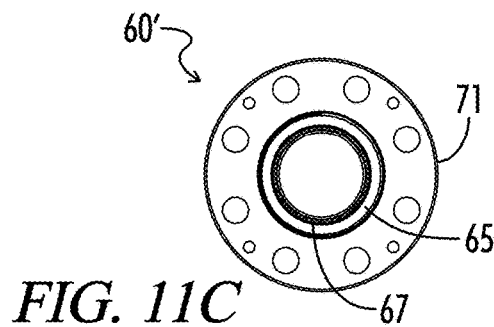
FIG. 11C is an end view of novel pipe joint 60'.

Thus, as appreciated by comparing FIGS. 8 and 9, union 51 between pipe joints 60 may be made up and sealed with only 12 threaded connectors 79 whereas union 40 between spools 34 requires 16 threaded connectors. Pipe joint 60 has been exemplified as having a 7-inch nominal inner diameter and a pressure rating of 15,000 psi. An identical pipe joint 60' and an identical conventional spool 34' fabricated with nominal inner diameters of 5" and the same pressure ratings are shown in FIGS. 10 and 11. As may be seen therein, novel pipe joint 60' can be made up with only 8 threaded connectors, while a comparable conventional spool 34' requires 12 threaded fasteners. Requiring fewer connectors, therefore, means that the novel fittings may be made up more quickly.

It also will be appreciated that novel pipe joints will comprise far less material than conventional spools. For example, conventional spool 34 and novel pipe joint 60 are both rated for pressures up to 15,000 psi. Pipe 41 of conventional spool 34 has an inner diameter of 7.063" and an outer diameter of 12.813". Its flanges 43 are each 4.03" wide and have an outer diameter of 19.875". Assuming a length of 10 feet, spool 34 incorporates over 7 cubic feet ($ft^3$) of steel and weighs about 3,500 pounds.

In contrast, pipe 61 in pipe joint 60 has an inner diameter of 6.747" and an outer diameter of 9.951". Its flanges are each 3.358" wide and have an outer diameter of 16.5". Assuming that it also has a length of 10 feet, pipe joint 60 incorporates less than 3.5 $ft^3$ of steel and weighs less than 1,700 lbs. Pipe joint 60, then, requires less than half of the steel required for conventional spool 34 and weighs less than half as much.

More importantly, because they weigh so much less per foot than conventional spools, it is practical to fabricate novel pipe joints in longer lengths. Longer runs of flowlines, such as distribution pipe 31 in zipper manifold 30 and feeder lines 27 supplying remote satellite zipper manifolds 16, most commonly are assembled from 10-foot spools. Occasionally, 20-foot spools may be used, but because of their weight, they represent the upper limit of lengths in which conventional spools are generally available. A 20-foot pipe joint 60, however, weighs less than a conventional 10-foot spool 34. A 30-foot pipe joint 60, as illustrated in FIG. 4, weighs approximately 25% less than a 20-foot conventional spool 34. That means that fewer pipe joints and fewer unions are required for a given run, saving a commensurate amount of assembly time and expense.

Moreover, material savings in fabricating the novel pipe joints as compared to conventional spools are even greater than the differences in weight may suggest. Conventional spool 34 most commonly is manufactured by starting with a solid cylindrical bar, drilling the conduit, and machining the flanges and other required geometry. The outer diameter of the bar is approximately the same as the outer diameter of flanges 43 on spool 34. Thus, again assuming a 10-foot spool, about 21.5 $ft^3$ of steel is used to produce spool 34 having a bit over 7 $ft^3$ of steel. The rest of the steel in the cylinder, over 14 $ft^3$ or approximately two thirds of the steel, ends up as shavings that must be recycled. While not without some waste, as compared to that generated during the manufacture of conventional spool 34, the waste generated in manufacturing pipe joint 60 is negligible.

While the cost of high yield steel used in manufacturing pipe joint 60 is more expensive that the steels typically used in conventional spool 34, the material cost savings are significant. There also is far less machining required to produce pipe joint 60. Thus, it is expected that the manufacturing cost of novel pipe joint 60 will be approximately 40% of the cost of conventional spool 34 of the same length and pressure rating.

Moreover, though not readily apparent from the figures, it will be appreciated that the wellheads serviced by a zipper manifold may be widely separated and will have long distribution pipes. In FIG. 3, for example, well heads 19 are shown as being spaced about 20 feet apart. In practice, wells serviced by the same zipper manifold may be spread across a run of 120 feet or more. Likewise, satellite zipper manifolds 16 may be located a great distance away from the pad on which frac system 24 is assembled. In some instances, they may be as much as 2,000 feet away. Thus, a very large number of 10-foot spools may be required to assemble the required flow lines. By incorporating fewer, longer novel pipe joints instead, the savings in acquisition and labor costs are multiplied commensurately.

As discussed above, novel pipe joints 60 provide significant advantages over conventional spools. The advantages have been exemplified in the context of specific sizes and dimensions. Fittings having a nominal 7" and 5" inner diameter are common in frac systems, although other sizes, such as 3.5", 4", and 9" also are used. Given the high flow rates common in fracturing operations, larger conduits are not only preferred, but a practical necessity. At the same time, the invention is not limited to specific sizes and dimensions. In that regard, as used herein, "pipe" shall be understood as an open, cylindrical conduit. It is not meant to exclude terms such a "tube" or "tubing" that may be understood as connoting specific sizes.

It also will be appreciated that the invention is not limited to pipe joints 60 or even pipe joints generally. The novel unions may be adopted and used in other types of pipe joints and fittings. Pipe joint 60, for example, is provided with rotatable flanges 71. Rotatable flanges offer greater convenience in making up unions 51 between pipe joints 60 and other flowline components. The threaded connection between flanges 71 and pipe 61 may be easily milled and allows easy rotation of flange 71. Other conventional designs, however, may be used to provide rotatable flanges. Rotatable flanges are disclosed, for example, in U.S. Pub. No. 2007/0114039 A1 of M. Hobdy et al. and U.S. Pat. No. 10,774,965 to T. Travis et al.

The novel pipe joints also may have fixed flanges. The pipe may be provided with an integral flange, either by machining a cylinder or by welding a flange or a flanged sub on its ends. Flow line 55 shown in FIGS. 12-13, for example, comprises a second preferred embodiment 80 of the novel flowline fittings, an elbow, a pair of third preferred embodiment 260, pipe joints, and a fourth preferred embodiment 90, a tee fitting. Pipe 261 in pipe joint 260 has integral flanges 271 at each of its end. A flange also may be threaded onto the ends by a threaded connection that is not readily rotated by hand. Finer, tapered threads, such as sharp v-threads, typically are used to join and seal pipe ends and may be used to provide an essentially fixed flange.

Figure 12:
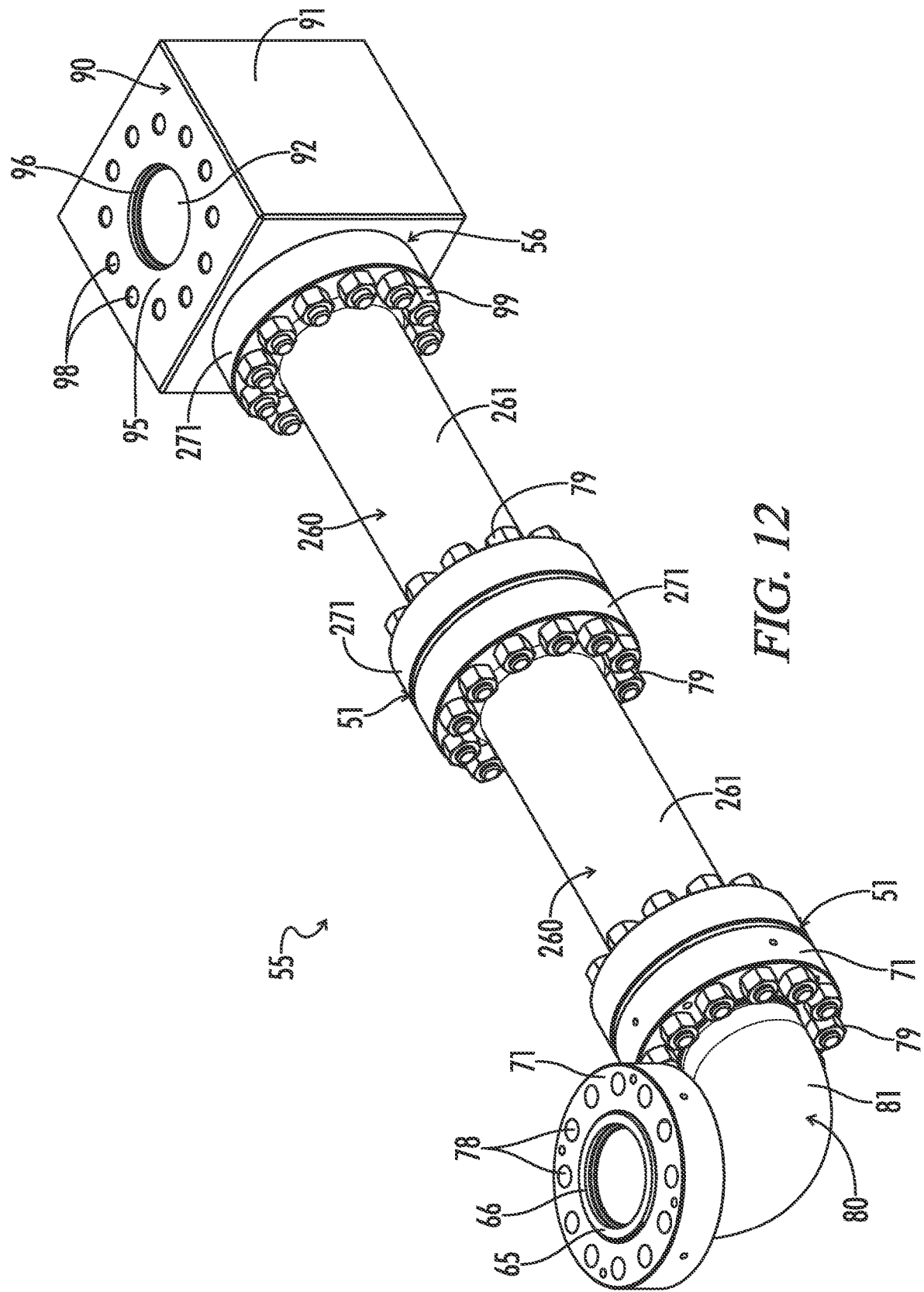
FIG. 12 is an isometric view of a flowline assembly 55 comprising a second preferred embodiment 80 of the novel flowline components, an elbow fitting, a pair of a third preferred embodiments 260, pipe joints, and a fourth preferred embodiment 90, a tee fitting, wherein one pipe joint 260 is joined to tee fitting 90 by a second preferred embodiment 56 of the novel unions.
Figure 13:
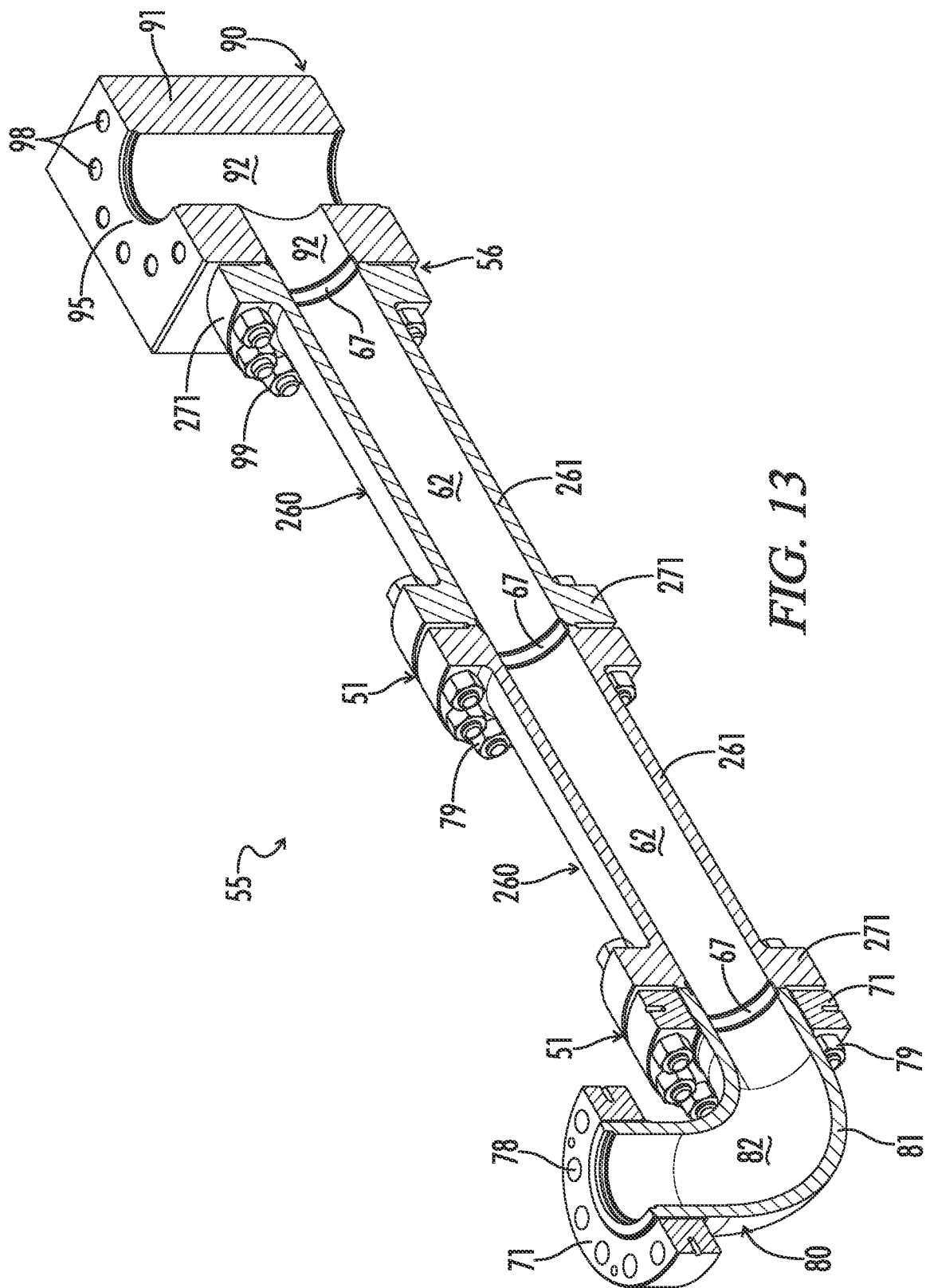
FIG. 13 is an axial, cross-sectional view of flowline assembly 55 shown in FIG. 12.

Pipe joints 60 and 260 are straight fitting. Elbows, wyes, tees, crosses, and other fittings, however, may be adapted so that they may be joined by the novel unions. So too may housings for valves, meters, gauges, and the like. For example, elbow fitting 80 shown in FIGS. 12-13 is substantially identical to pipe joint 60 except that pipe 81 is bent into a 90° angle whereas pipe 61 of pipe joint 60 is straight. Like pipe joint 60, each end of elbow fitting 81 is provided with rotatable flanges 71. Elbow 80 may be joined to other flowline components, such as pipe joint 60, by union 51 incorporating, inter alia, seal assembly 67. Rotatable flanges 71 are especially preferred for elbow fitting 80 as they allow its 90° turn to be oriented in any desired direction. If desired, however, the novel elbows may be provided with fixed flanges as with the novel pipe joints.

Conduits 62 and 82 in, respectively, pipe joints 60 and elbow fitting 80, are provided by pipes 61 and 81. Similarly, pipe joints 60 and elbow fitting 80 have flanges 71. The subject invention, however, is not limited to flowline components and unions where the conduit is provided by a pipe or flowline components having a flange. The flowline may be a block fitting providing, for example, an elbow, wye, or cross fitting or a housing for flowline valves, gauges, and the like. For example, a third preferred embodiment 90 of the novel flowline components, a block tee fitting, is also shown in FIGS. 12-13.

Tee fitting 90 has a generally prismatic, and more particularly, a cubic fitting body 91. Bores 92 extend through fitting body 91 and provide conduits for the flow of fluids through tee fitting 90. The faces of fitting body 91 or, more particularly, the annular area abutting annular bearing surface 65 on pipe joint 260 provides an annular bearing surface 95. If desired, annular bearing surface 95 may be provided by a shallow, annular boss on the face of tee fitting 90. An annular rabbet 96, substantially identical to rabbets 66 in pipe joints 60, is provided on the inner edge of bearing surfaces 95. Annular rabbets 96 form glands 53 in which are carried seal assemblies 67.

Fitting body 91 is provided with, for example, 12 bottomed holes 98 that are arrayed angularly around the openings of each bore 92 Holes 98 are adapted to receive threaded connectors 99, such as threaded studs, standing bolts, standard single-end threaded bolts with a head, and double-end threaded bolts. Thus, tee fitting 90 may be joined to pipe joint 60 and other flowline components by a union 56 that is substantially equivalent to union 51 joining, for example, elbow fitting 80 and pipe joint 60.

It will be appreciated, however, that while pipe joints 60 and elbow fitting 80 preferably are fabricated from high yield steel, it may be preferred to fabricate tee fitting 90 from cheaper, high tensile steels used in conventional flowline components. Low yield, high tensile steels necessitate thicker conduit walls. The connector holes in tee fitting 90, however, must align with, for example, holes 78 in flange 71 of pipe joint 60. The diameter of the array of holes 78 is reduced in pipe joint 60 as compared to holes 48 in conventional spool 34. The dimensions of body 91 of tee fitting 90 preferably are scaled down proportionally. Even when scaled down, however, the walls of conduit 92 still will have sufficiently thick walls to match the pressure rating of pipe joint 60. Thus, there is little to be gained by using more expensive high yield steel in tee fitting 90.

Elbow fitting 80, pipe joints 60, and tee fitting 90 in flowline assembly 55 shown in FIGS. 12-13 are all joined by novel unions 51 and 56. Other flow lines and flowline assemblies, however, may incorporate components assembled with conventional flange unions as well as components joined by the novel unions. For example, flowline assembly 50 shown in FIGS. 4 and 5, incorporates conventional spools 34 as well as novel pipe joints 60. Thus, the subject invention provides for adaptors that allow components joined by the novel unions to be assembled to components adapted for conventional flange or for other conventional unions such as a hammer unions and clamp unions.

Figure 14:
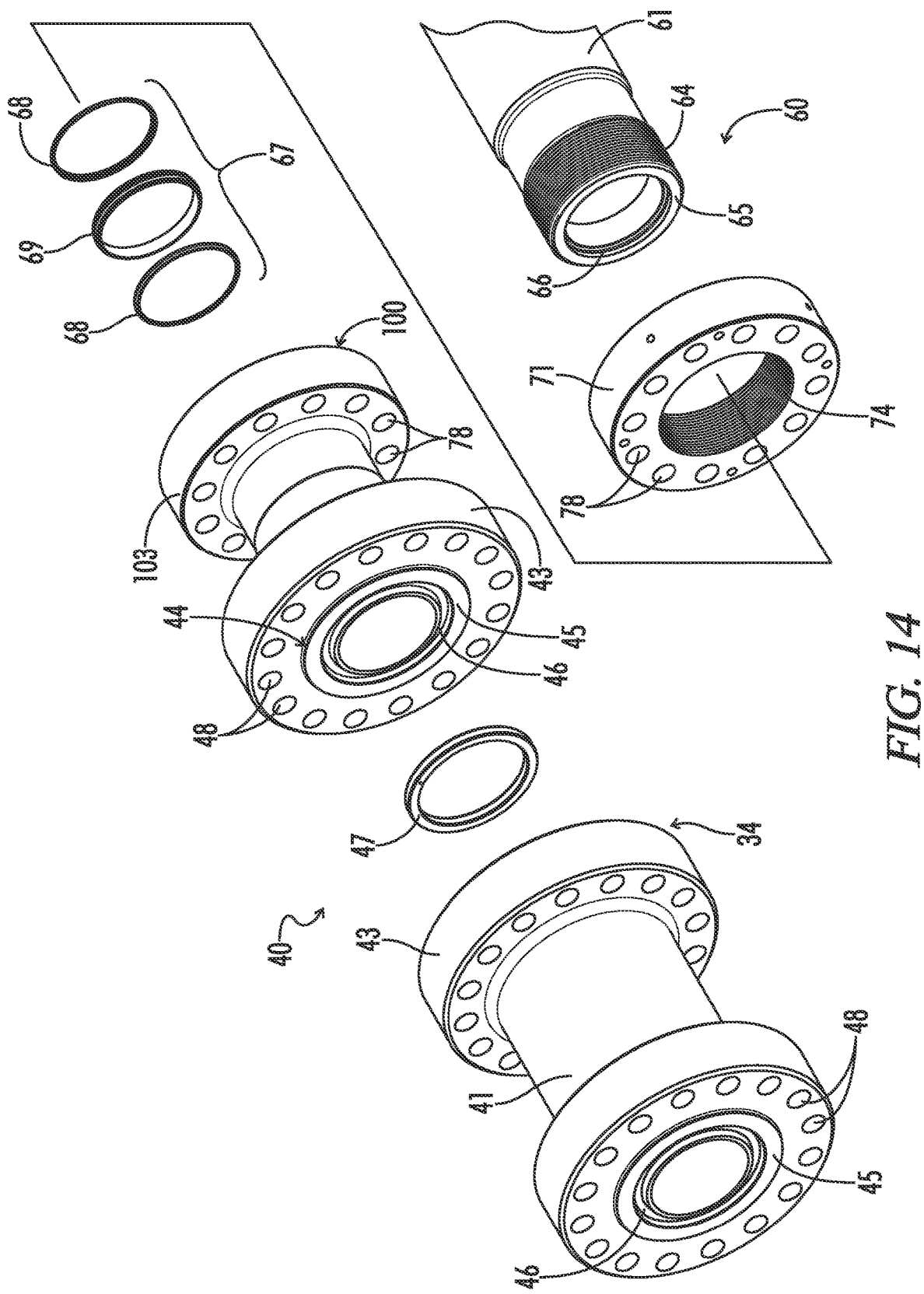
FIG. 14 is an exploded, isometric view showing novel adaptor 100 connecting pipe joint 60 to a conventional spool 34 as shown in FIG. 5.
Figure 15:
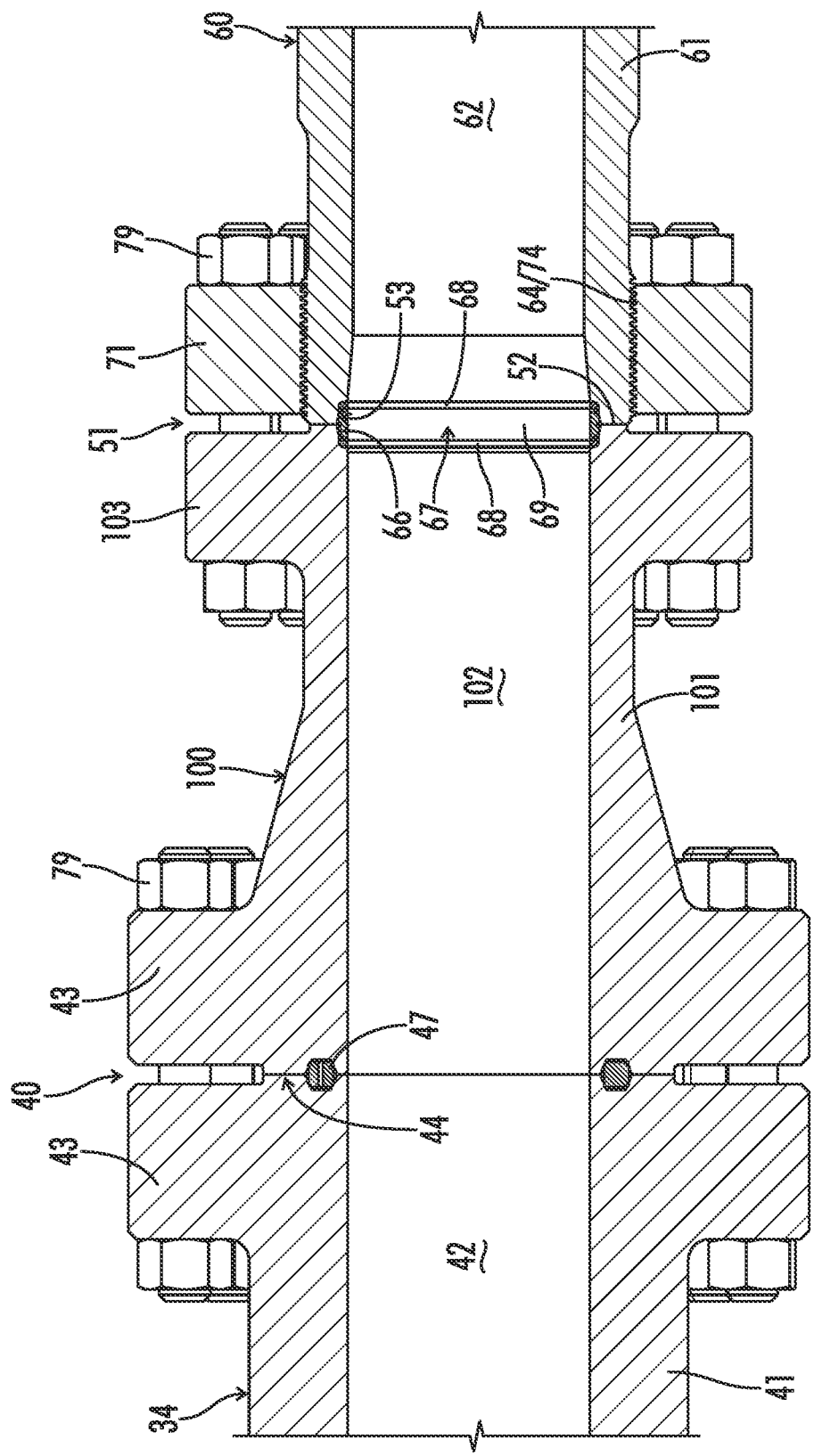
FIG. 15 is a cross-sectional view of adaptor 100 shown in FIG. 14.

A first preferred embodiment 100 of the novel adaptors is shown in FIGS. 4, 5, 14, and 15. Adaptor 100, as best appreciated from FIG. 14, is a spool-like fitting. It comprises a pipe 101 that provides a conduit 102 for the flow of fluids through adaptor 100. A flange 103 is provided on one end (the right end), and a flange 43 is provided on the other end (the left end). Flange 103 has, for example, 12 through holes 78 arrayed angularly around the opening of conduit 102. Flange 43 has, for example, an array of 16 through holes 48.

The one end of adaptor 100 provides a union sub similar to the ends of novel pipe joints 60. That end has an annular bearing surface 65, a rabbet 66, and a seal assembly 67. A union 51 to, for example, novel pipe joint 60 will be made up by tightening threaded connectors 79, such as nuts and bolts, extending through openings 78 in flange 103 on adaptor 100 and openings 78 in flange 71 on pipe joint 60. Unlike rotatable flanges 71 on pipe joints 60, however, flange 103 in adaptor 100 is a fixed, non-rotatable flange formed integrally with the body of adaptor 100.

The other end of adaptor 100 provides a union sub identical to the ends of conventional spool 34. That end has an annular boss 45, an annular groove 46, and a metal seal ring 47 as in conventional spool 34. A conventional flange union 40 to, for example, spool 34 will be made up by tightening threaded connectors 79 extending through openings 48 in flanges 43 on adaptor 100 and spool 34.

Figure 16:
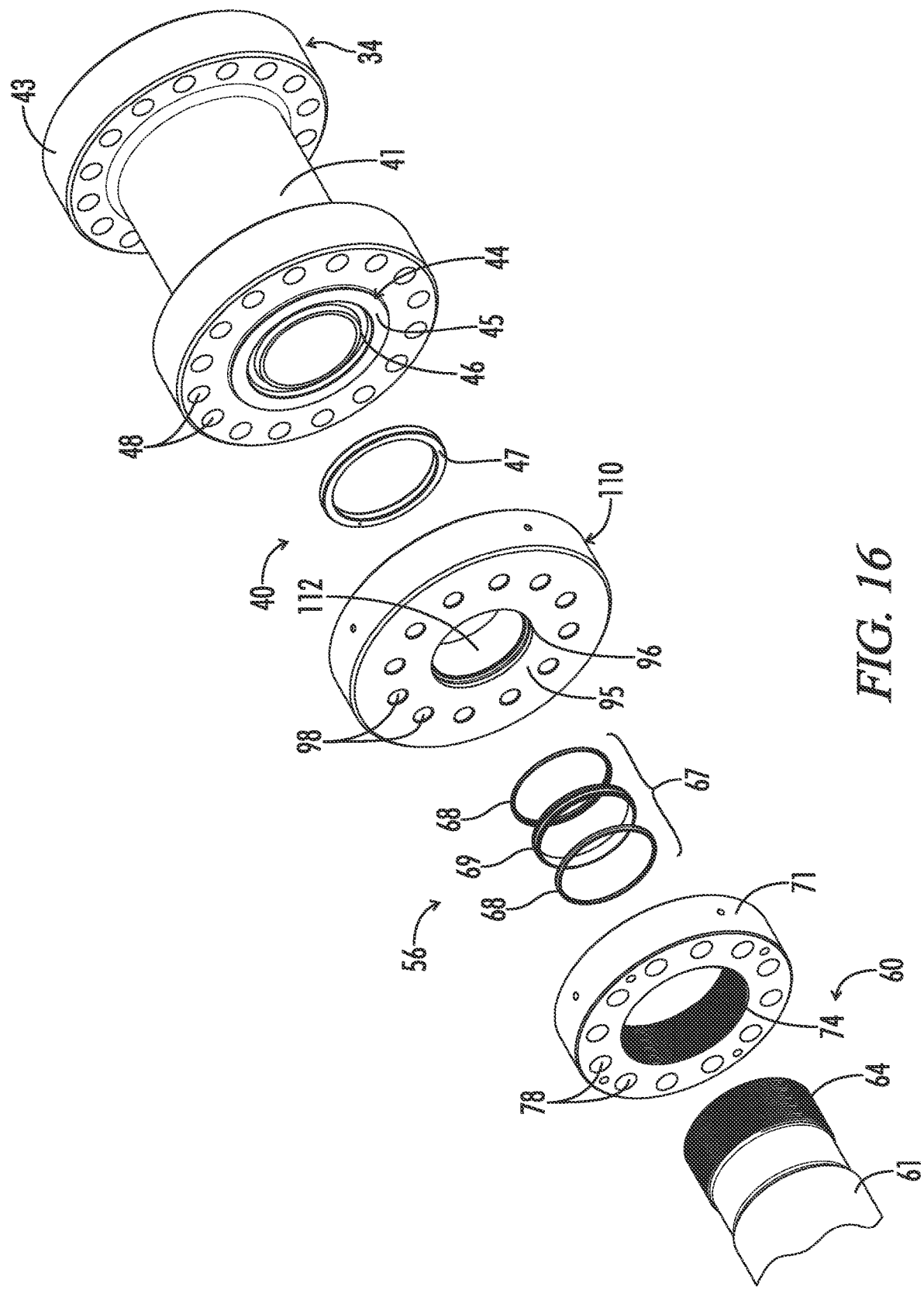
FIG. 16 is an exploded, isometric view showing novel adaptor 110 connecting pipe joint 60 to a conventional spool 34 as shown in FIG. 5.
Figure 17:
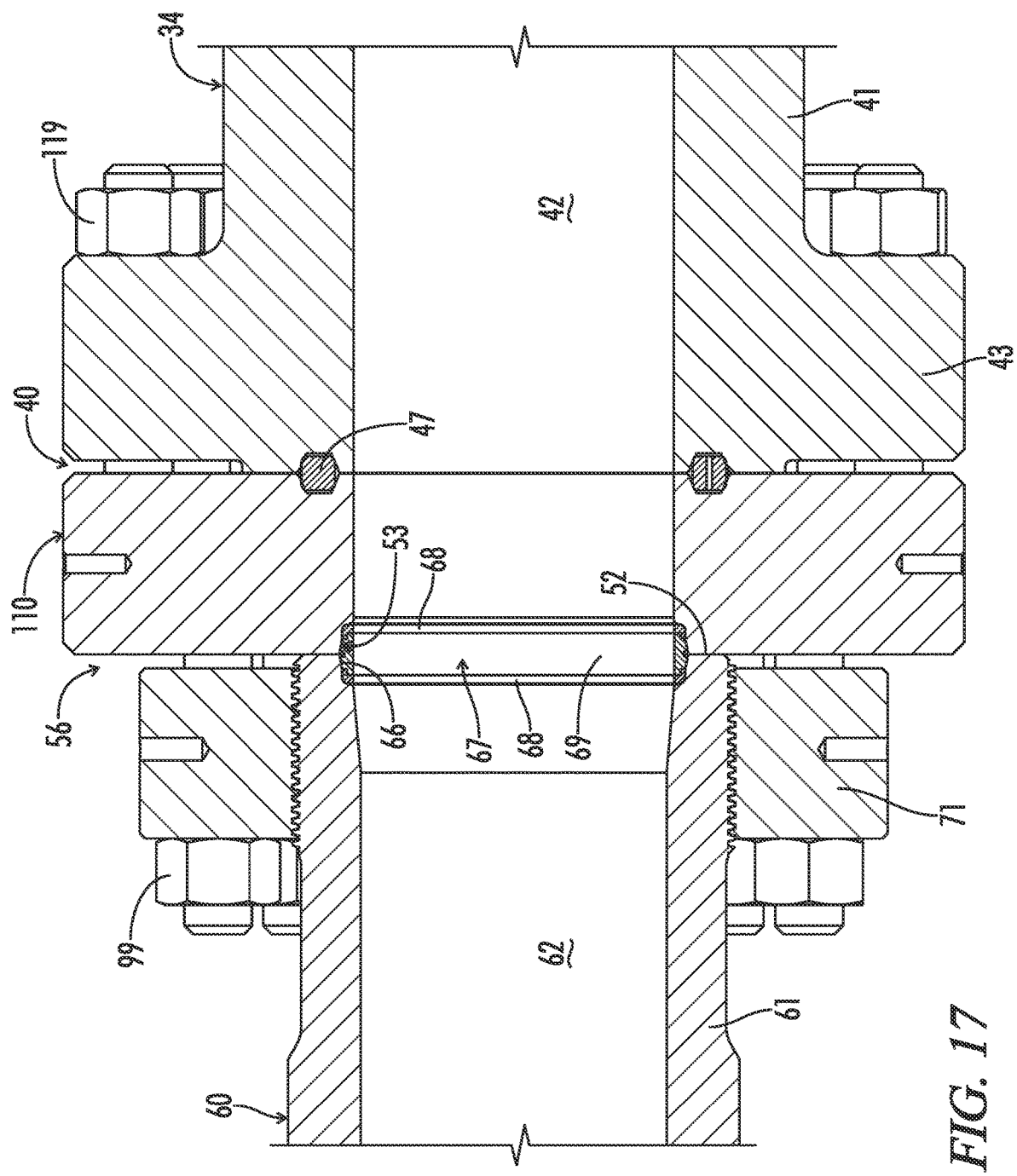
FIG. 17 is a cross-sectional view of adaptor 110 shown in FIG. 16.

A second preferred embodiment 110 of the novel adaptors is shown in FIGS. 4, 5, 16, and 17. Adaptor 110, as best appreciated from FIG. 16, is a toroid, flange-like fitting. It has a central opening that provides a conduit 112 allowing flow through adaptor 110. One side (the left side) has, for example, 12 bottomed holes 98 arrayed angularly around the opening of conduit 112. The other side (the right side) has, for example, an array of 16 bottomed holes 118.

The one side of adaptor 110 provides a union sub similar to that in novel tee fitting 90. That side has an annular bearing surface 95, a rabbet 96, and a seal assembly 67. A union 56 to, for example, pipe joint 60 will be made up by mounting threaded connectors 99, such as threaded studs, into bottomed holes 98.

The other side of adaptor 110 provides a union sub identical to the ends of conventional spool 34. That side has an annular boss 45, an annular groove 46, and a metal seal ring 47 as in conventional spool 34. A conventional flange union to, for example, spool 34 will be made up by mounting threaded connectors 119, such as threaded studs, into bottomed holes 118.

Figure 18:
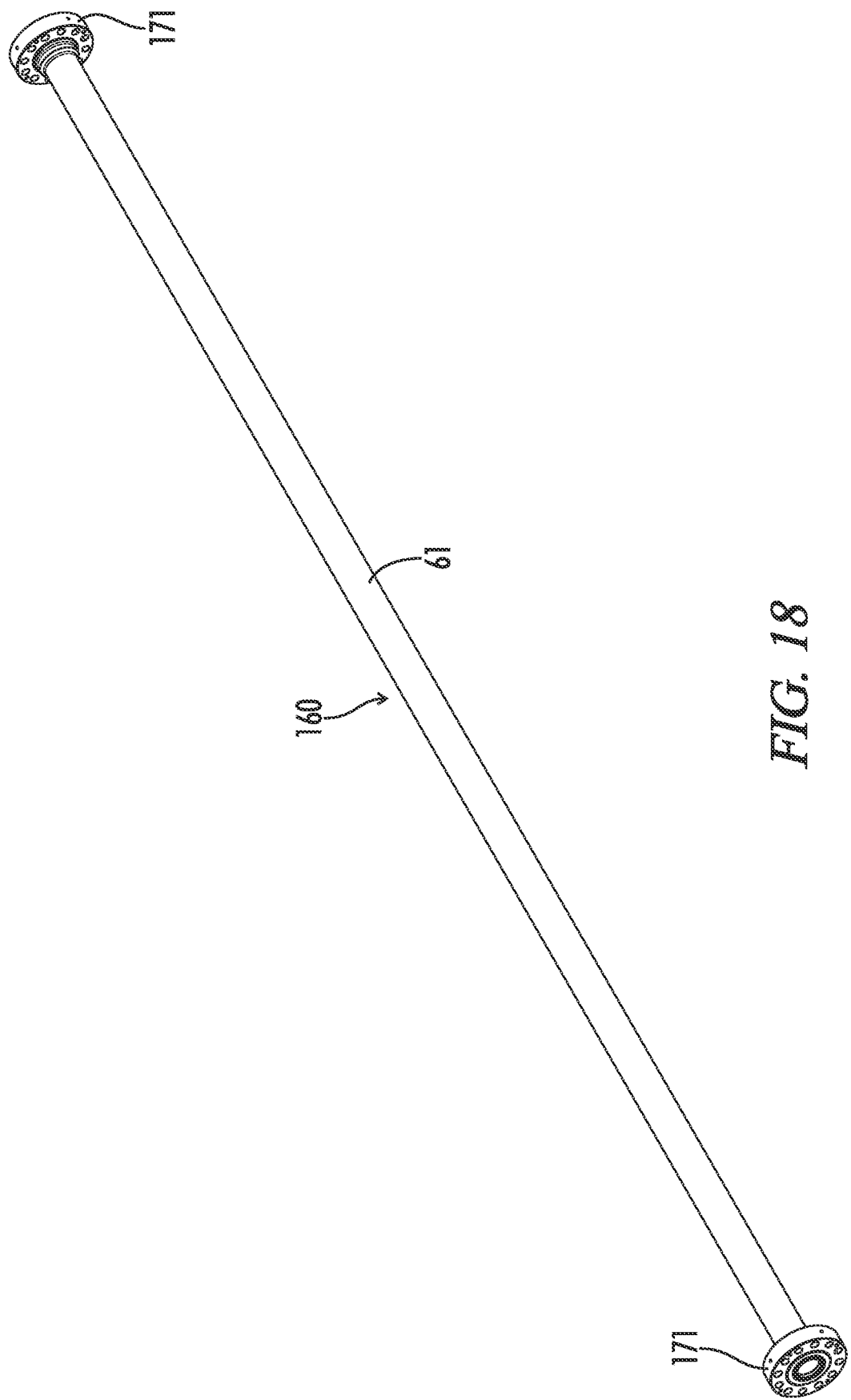
FIG. 18 is an isometric view of a fifth preferred embodiment 160 of the novel pipe joints.
Figure 19:
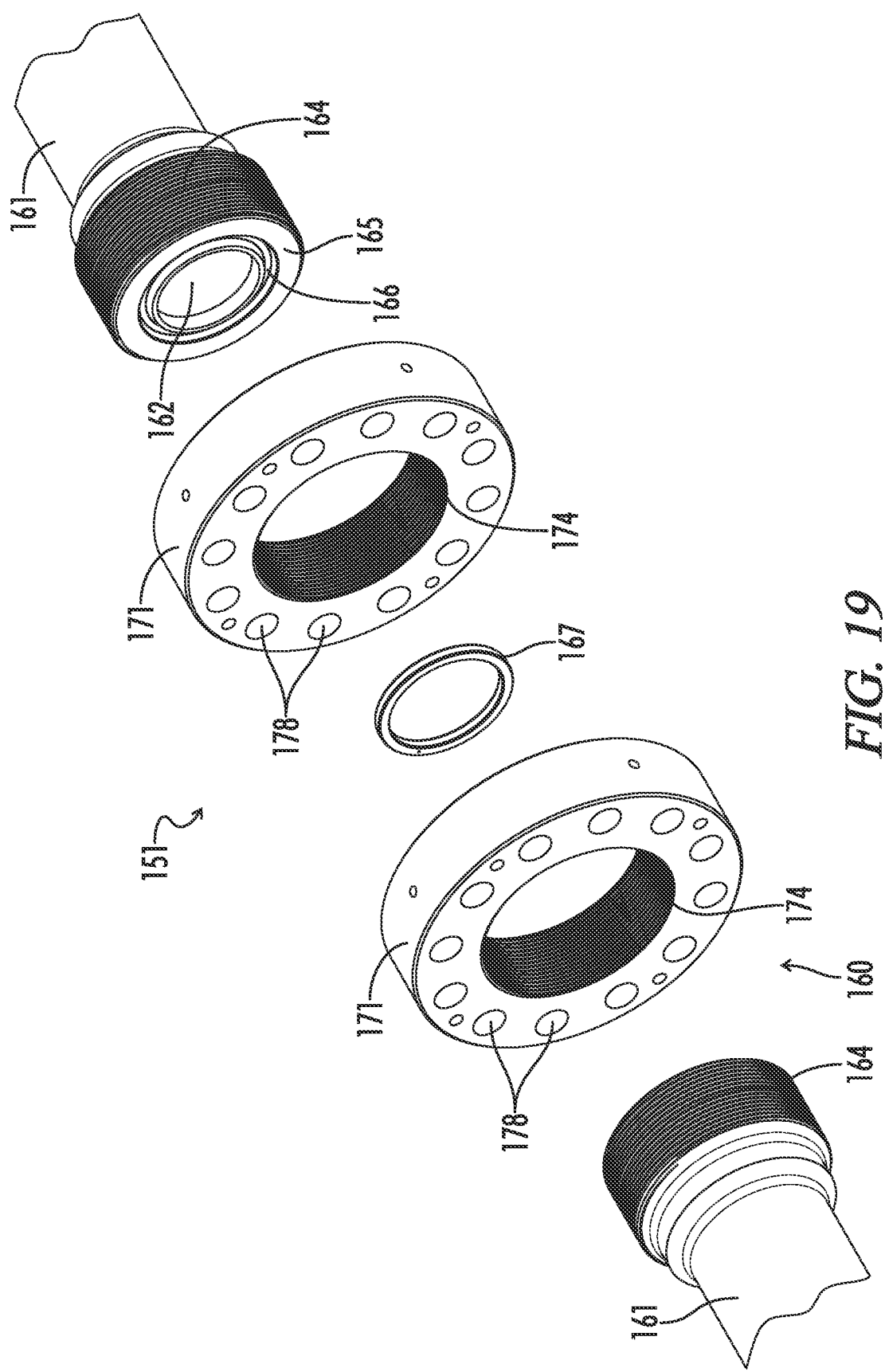
FIG. 19 is an isometric, exploded view showing a third preferred embodiment 151 of the novel unions joining two novel pipe joints 160.
Figure 20:
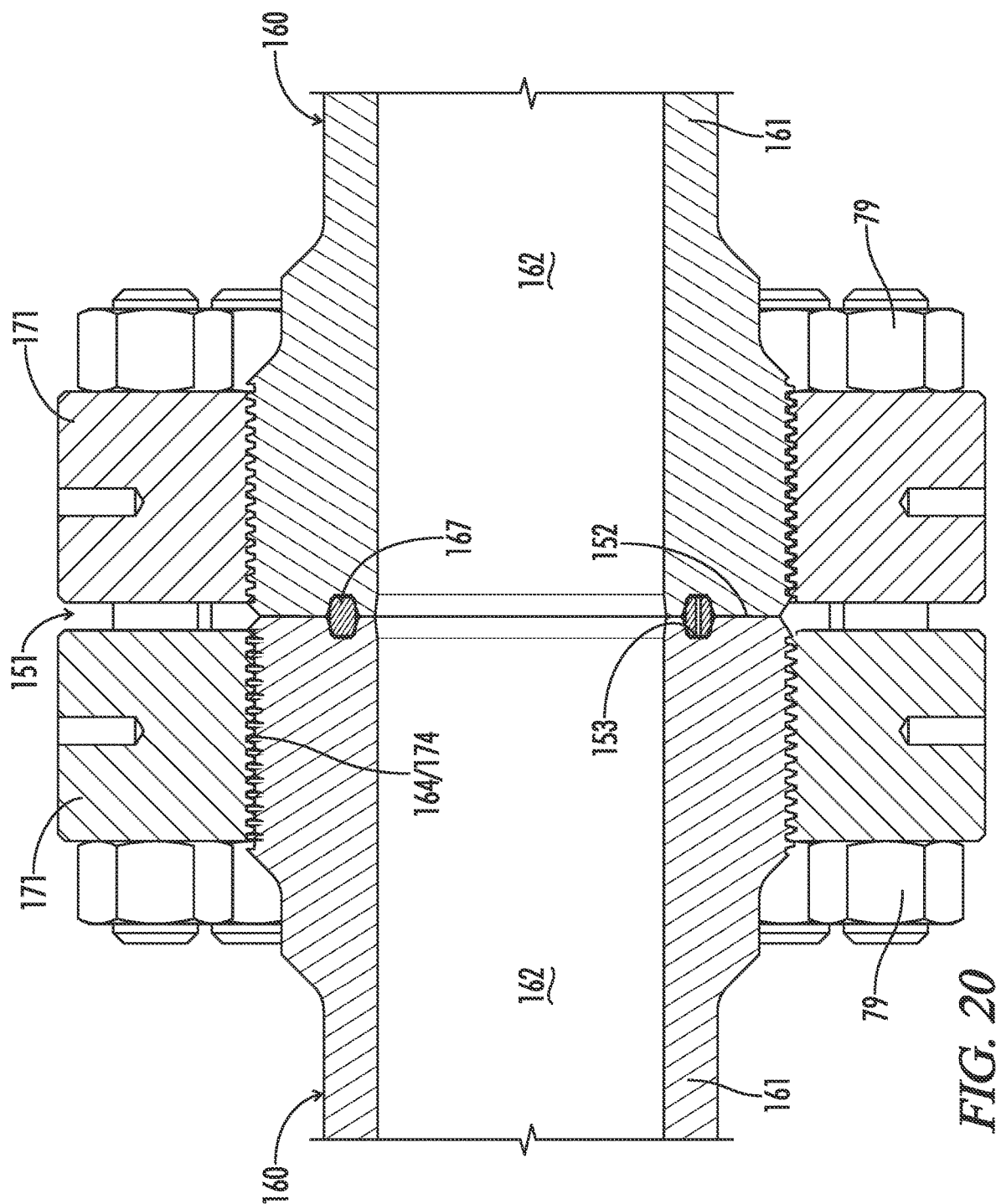
FIG. 20 is a cross-sectional view of union 151 joining pipe joints 160.

Another preferred embodiment 160 of the novel pipe joints is shown in FIGS. 18-20. Novel pipe joint 160 is shown in FIG. 18 in a length suitable for assembling relatively long runs of flowlines, but they may be fabricated in any length. They may be used, for example, in zipper manifold 30, feeder lines 27, and in other flow lines wherever novel pipe joints 60 might be used. Novel adaptors, similar to those used with novel pipe joint 60, also may be used to join novel pipe joints 160 to other flowline components having conventional flange or other types of conventional unions.

Novel pipe joints 160 comprise a pipe 161 and a pair of rotatable flanges 171. Pipe 161 provides a conduit 162 for the flow of fluids through pipe joint 160. As in pipe joint 60, the ends of pipe 161 are provided with external threads 164. Likewise, flanges 171 are substantially identical to flanges 71 of pipe joint 60. A central hole has internal threads 174 that allow flanges 171 them to be threaded on, and rotate about the ends of pipe 161. As in pipe joint 60, threads 164/174 preferably are 6 pitch ACME threads or other threads that allow flanges 171 to be rotated easily by hand. A union 151 may be made up between pipe joints 160 with threaded connectors 79, such as nuts and bolts, extending through holes 178 in flanges 171. Threaded connectors 79 will generate axial load across union 151.

Pipe 161 of pipe joint 160, like preferred embodiments of pipe 61 of pipe joint 60, is a seamless pipe fabricated from a high yield steel by a hot or cold roll process. As seen best in FIG. 20, the ends of pipe 161 have been upsetted to provide the end with an enlarged outer diameter relative to the nominal outer diameter D of pipe 161. Upsetting is a forging process in which a die and mandrel are used to enlarge the wall thickness of a pipe at its ends. In essence, material at the end of the pipe is pushed back into the pipe to thicken the wall.

The face of each end of pipe 161 provides a bearing surface 165 that forms an abutment 152 with, for example, the bearing surface 165 of another pipe joint 160 when union 151 is made up. An annular groove 166 is formed in bearing surface 165. Groove 166 has a semi-hexagonal cross-section. When union 151 is made up, groove 166 in a first pipe joint 160 mates, for example, with groove 166 in a second pipe joint 160. The mating grooves 166 provide a gland 153 having a hexagonal cross-section. A hexagonal metal seal 167 is carried within gland 153. The design of metal seal 167 and groove 166 is the same as, for example, metal seal 47 and groove 46 in conventional spool 34. Other designs for metal seals as grooves as used in conventional flange unions may be used if desired.

Upsetted, high yield seamless steel pipe has been used to assemble the drill string to which a bit is attached when drilling a well. The pipe joints are threaded together, commonly by providing external tapered threads on one end of the joint and a box with internal threads on the other end. The increased wall thickness allows the upsetted portion to be threaded while still retaining nominal or greater wall thickness under the threads. Upsetted ends also provide thicker, stronger areas for welding an internally-threaded box. Moreover, they provide a smoother transition from relatively stiff unions connecting the joints to the relatively flexible length of the pipe.

In novel pipe joint 160, however, the upsetted ends of pipe 161 allow the use of relatively thin-walled high yield steel pipe while providing adequate thickness in which to form grooves 166 and mount seal ring 167. Novel pipe joint 160 thus has the advantage of utilizing robust, conventional seal-gland designs providing an internal seal that is not exposed to fluids flowing through conduit 161. Although upsetting the ends of pipe 161 is a more involved, costly process than milling the ends of pipe 61, pipe joint 160 provides many of the same advantages of pipe joint 60.

Like pipe joints 60, novel upsetted pipe joints 160 will require far less material, and weigh far less than conventional spools. Their reduced weight likewise allows them to be fabricated in lengths that are not practical in conventional spools. That in turn allows a given run to be assembled with fewer pipe joints and fewer unions. The machining required, and the waste generated in manufacturing novel upsetted pipe joints 160 also is reduced dramatically as compared to that for manufacturing conventional spools. Thus, upsetted pipe joints 160 also can be manufactured more cheaply and will have a greatly reduced carbon footprint.

As with unions 51 and pipe joint 60, unions 151 used to join the upsetted ends of pipe joints 160 may be used in other types of fittings such as elbows, wyes, tees, and crosses, or in fitting housings for valves and other flowline components. The novel upsetted components also may be provided with other types of rotatable flanges or fixed flanges. The fittings may use pipe as the conduit and have flanges, or the fittings may be block fittings similar to tee fitting 90. Spool-like and flange-like adaptors, similar to adaptors 100 and 110, may be provided with a mating union face allowing the novel upsetted fittings to be assembled to components adapted for conventional flange unions or other conventional unions.

The novel components also will incorporate various features of conventional high-pressure flowline components. For example, the novel fittings are quite heavy and, therefore, may incorporate components which make it easier to handle and manipulate the fittings, such as lifting eyes. Other conventional features may be incorporated into the novel components as will be readily appreciated by workers in the art having the benefit of this disclosure.

Similarly, the novel components and unions have been described in the context of frac systems. While frac systems in particular and the oil and gas industry in general rely on components that can be assembled and disassembled easily to provide temporary, transportable high pressure systems, the novel components and unions are not limited to such applications or industries. Likewise, they are not limited in their application to the specific, exemplified flow lines, zipper manifold, or frac systems, or to the mentioned pressure ratings. Suffice it to say that the novel components and unions have wide applicability wherever unions have been conventionally applied.

While this invention has been disclosed and discussed primarily in terms of specific embodiments thereof, it is not intended to be limited thereto. Other modifications and embodiments will be apparent to the worker in the art.

What is claimed is:

1. A system for fracturing a well, said system comprising:
   (a) a flow line adapted to convey frac fluid discharged from one or more high-pressure pumps to a well head; and (b) a union joining a first component of said flow line and a second component of said flow line, wherein:

(c) each of said first and second flowline components comprises:
   i) a conduit having an end;
   ii) an annular bearing surface on an end face of said conduit end;
   iii) a plurality of holes arrayed around said annular bearing surface, said holes being adapted to accommodate threaded connectors; and
   iv) an annular rabbet in said end face extending around the inner circumference of said bearing surface;

(d) said union comprises:
   i) an abutment between said bearing surface of said first flowline component and said bearing surface of said second flowline component;
   ii) an annular gland extending axially across and radially inward of said abutment, said gland being formed by alignment of said rabbet of said first flowline component and said rabbet of said second flowline component; and
   iii) a seal assembly carried in said gland, said seal assembly comprising:
      (1) a metal seal backup ring carried in a center portion of said gland, said backup ring extending axially across said abutment;
      (2) a first elastomeric seal ring carried in said gland between said backup ring and a first side of said gland;
      (3) a second elastomeric seal ring carried in said gland between said backup ring and a second side of said gland; and
   iv) a plurality of threaded connectors extending through said holes in said first flowline component and said holes in said second flowline component, said threaded connectors applying axial load to said abutment to form said union.

2. The system of claim 1, wherein at least one of said first and second flowline components comprises:
   (a) external threads provided on said conduit end; and
   (b) a rotatable flange, said rotatable flange having a central opening having internal threads engaging said external threads on said conduit end;
   (c) wherein:
      i) said conduit is fabricated from high yield steel; and
      ii) said holes are arrayed on said rotatable flange.

3. The system of claim 1, wherein said backup ring has an outer gland engagement surface having first and second beveled surfaces matching, respectively, a radially inward taper in the side of said first component rabbet and a radially inward taper in the side of said second component rabbet.

4. The system of claim 3, wherein each of said inward tapers are from about 5° to about 15°.

5. The system of claim 1, wherein said backup ring has an annular rabbet at each of an end thereof and said elastomeric seals have a lip nesting in said backup ring rabbets.

6. The system of claim 1, wherein at least one of said first and second flowline components is fabricated from high yield steel.

7. The system of claim 1, wherein said conduit of at least one of said first and second flowline components is fabricated from high yield steel pipe.

8. The system of claim 7, wherein said conduit of said at least one of said first and second flowline components has an internal diameter of approximately 7 inches, a nominal wall thickness, and a pressure rating of 15,000 psi, wherein a ratio of the internal diameter and said nominal wall thickness is from about 5 to about 9.

9. The system of claim 7, wherein said conduit of at least one of said first and second flowline components has an internal diameter of approximately 7 inches, a nominal wall thickness, and a pressure rating of 20,000 psi, wherein a ratio of the internal diameter and said nominal wall thickness is from about 4 to about 7.

10. The system of claim 7, wherein said conduit of at least one of said first and second flowline components has an internal diameter of approximately 5 inches, a nominal wall thickness, and a pressure rating of 15,000 psi, wherein a ratio of the internal diameter and said nominal wall thickness is from about 5 to about 9.

11. The system of claim 7, wherein said conduit of at least one of said first and second flowline components has an internal diameter of approximately 5 inches, a nominal wall thickness, and a pressure rating of 20,000 psi, wherein a ratio of the internal diameter and said nominal wall thickness is from about 4 to about 7.

12. The system of claim 1, wherein said conduit of at least one of said first and second flowline components is fabricated from hot rolled seamless steel pipe.

13. The system of claim 1, wherein said conduit of at least one of said first and second flowline components has an internal diameter of approximately 7 inches and said first and second flowline components have no more than 12 said holes adapted to accommodate said threaded connectors.

14. The system of claim 1, wherein said conduit of at least one of said first and second flowline components has an internal diameter of approximately 5 inches and said first and second flowline components have no more than 8 said holes adapted to accommodate said threaded connectors.

15. The system of claim 1, wherein at least one of said first and second flowline components is a pipe joint.

16. The system of claim 1, wherein in respect to at least one of said first and second flowline components:
   (a) said conduit is fabricated from high yield steel; and
   (b) said holes are arrayed on an integral flange extending around said conduit end and said annular bearing surface.

17. A flowline component adapted for assembly into a flow line by a union, said flowline component and said union being adapted to convey frac fluid discharged from one or more high-pressure pumps to a well head, said union comprising a bearing surface abutment, an annular gland extending axially across and radially inward of said abutment, and a seal assembly, wherein said seal assembly is carried in said gland and comprises an annular metal seal backup ring carried between first and second elastomeric seals, said flowline component comprising:
   (a) a conduit having an end;
   (b) an annular bearing surface on an end face of said conduit end, said bearing surface being adapted to bear on an annular bearing surface of a second component of said flow line to provide said abutment;
   (c) a plurality of holes arrayed around said annular bearing surface, said holes being adapted to accommodate threaded connectors extending through said holes in said flowline component and through a plurality of holes in said second component to apply axial load to said abutment to form said union; and
   (d) an annular rabbet in said end face extending around the inner circumference of said bearing surface: wherein said rabbet is adapted to:
      i) align with an annular rabbet of said second component to form said gland; and ii) receive said first elastomeric seal adjacent said annular metal seal backup ring.

18. The flowline component of claim 17, wherein said conduit of said flowline component comprises:
   (a) external threads on said conduit end; and
   (b) a rotatable flange, said rotatable flange having a central opening having internal threads engaging said external threads on said conduit end;
   (c) wherein:
      i) said conduit is fabricated from high yield steel; and
      ii) said holes are arrayed on said rotatable flange.

19. The flowline component of claim 17, wherein said conduit is fabricated from high yield steel pipe.

20. The flowline component of claim 19, wherein said conduit has an internal diameter of approximately 5 inches, a nominal wall thickness, and a pressure rating of 15,000 psi, wherein a ratio of the internal diameter and said nominal wall thickness is from about 5 to about 9.

21. The flowline component of claim 20, wherein said conduit is fabricated from high yield steel having a yield strength of at least about 105 ksi.

22. The flowline component of claim 19, wherein said conduit has an internal diameter of approximately 5 inches, a nominal wall thickness, and a pressure rating of 20,000 psi, wherein a ratio of the internal diameter and said nominal wall thickness is from about 4 to about 7.

23. The flowline component of claim 22, wherein said conduit is fabricated from high yield steel having a yield strength of at least about 105 ksi.

24. The flowline component of claim 19, wherein said conduit has an internal diameter of approximately 7 inches, a nominal wall thickness, and a pressure rating of 15,000 psi, wherein the ratio of the internal diameter and said nominal wall thickness is from about 5 to about 9.

25. The flowline component of claim 24, wherein said conduit is fabricated from high yield steel having a yield strength of at least about 105 ksi.

26. The flowline component of claim 19, wherein said conduit has an internal diameter of approximately 7 inches, a nominal wall thickness, and a pressure rating of 20,000 psi, wherein the ratio of the internal diameter and said nominal wall thickness is from about 4 to about 7.

27. The flowline component of claim 26, wherein said conduit is fabricated from high yield steel having a yield strength of at least about 105 ksi.

28. The flowline component of claim 17, wherein said conduit is fabricated from hot rolled seamless steel pipe.

29. The flowline component of claim 17, wherein said flowline component is a pipe joint.

30. The flowline component of claim 17, wherein:
   (a) said conduit of said flowline component is fabricated from high yield steel; and
   (b) said holes in said flowline component are arrayed on an integral flange extending around said conduit end of said flowline component.

31. The flowline component of claim 17, wherein said flowline component comprises a second conduit end identical to said conduit end.

32. A high-pressure fluid transportation system, said system comprising the flowline component of claim 17.

33. A method of assembling a system for fracturing a well, said method comprising assembling the flowline component of claim 17 into a flow line adapted to convey frac fluid discharged from one or more high-pressure pumps to a well head.

34. A system for fracturing a well, said system comprising:
   (a) a flow line adapted to convey frac fluid discharged from one or more high-pressure pumps to a well head; and
   (b) a union joining a first flowline component of said flow line and a second flowline component of said flow line, wherein:
   (c) said first flowline component comprises:
      i) a conduit fabricated from high yield steel pipe, said conduit having a nominal wall thickness;
      ii) an upsetted end of said conduit, said upsetted conduit end providing a portion of increased wall thickness relative to said conduit nominal wall thickness and comprising external threads;
      iii) an annular bearing surface on an end face of said upsetted conduit end;
      iv) an annular groove in said bearing surface; and
      v) a rotatable flange having
         A) a central opening having internal threads engaging said external threads on said upsetted conduit end and
         B) a plurality of holes adapted to accommodate threaded connectors;
   (d) said second flowline component comprises:
      i) a conduit having an end;
      ii) an annular bearing surface on an end face of said conduit end;
      iii) an annular groove in said bearing surface; and
      iv) a plurality of holes adapted to accommodate threaded connectors; and
   (e) said union comprises:
      i) an abutment between said bearing surface of said first flowline component and said bearing surface of said second flowline component;
      ii) an annular gland in said abutment, said gland being formed by alignment of said groove of said first flowline component and said groove of said second flowline component;
      iii) an annular metal seal carried in said gland; and
      iv) a plurality of threaded connectors extending through said holes in said rotatable flange of said first flowline component and said holes of said second flowline component, said threaded connectors applying axial load to said abutment and said seal.

35. The system of claim 34, wherein said first flowline component is a pipe joint.

36. The system of claim 35, wherein said conduit of said pipe joint is fabricated from hot rolled seamless steel pipe fabricated from high yield steel having a yield strength of at least about 105 ksi.

37. The system of claim 34, wherein said conduit of said first flowline component is fabricated from hot rolled seamless steel pipe.

38. The system of claim 37, wherein said first flowline component is a pipe joint and said conduit of said pipe joint is fabricated from hot rolled seamless steel pipe fabricated from high yield steel having a yield strength of at least about 105 ksi.

39. The system of claim 34, wherein said conduit of said first flowline component has an internal diameter of approximately 7 inches and a pressure rating of 15,000 psi, wherein a ratio of the internal diameter and said nominal wall thickness is from about 5 to about 9.

40. The system of claim 39, wherein said first flowline component is a pipe joint and said conduit of said pipe joint is fabricated from hot rolled seamless steel pipe fabricated from high yield steel having a yield strength of at least about 105 ksi.

41. The system of claim 34, wherein said conduit of said first flowline component has an internal diameter of approximately 7 inches and a pressure rating of 20,000 psi, wherein a ratio of the internal diameter and said nominal wall thickness is from about 4 to about 7.

42. The system of claim 41, wherein said first flowline component is a pipe joint and said conduit of said pipe joint is fabricated from hot rolled seamless steel pipe fabricated from high yield steel having a yield strength of at least about 105 ksi.

43. The system of claim 34, wherein said conduit of said first flowline component has an internal diameter of approximately 5 inches and a pressure rating of 15,000 psi, wherein a ratio of the internal diameter and said nominal wall thickness is from about 5 to about 9.

44. The system of claim 34, wherein said conduit of said first flowline component has an internal diameter of approximately 5 inches and a pressure rating of 20,000 psi, wherein a ratio of the internal diameter and said nominal wall thickness is from about 4 to about 7.

45. The system of claim 34, wherein said gland has a hexagonal cross-section and said groove of said first flowline component and said groove of said second flowline component have a semi-hexagonal cross-section.

* * * * *